US011596883B2

(12) United States Patent
Ardes

(10) Patent No.: US 11,596,883 B2
(45) Date of Patent: Mar. 7, 2023

(54) FLUID FILTER WITH A VALVE UNIT AND FILTER ELEMENT FOR USE IN THE FLUID FILTER

(71) Applicant: Hengst SE, Muenster (DE)

(72) Inventor: Wilhelm Ardes, Ascheberg (DE)

(73) Assignee: Hengst SE, Muenster (DE)

( * ) Notice: Subject to any disclaimer, the term of this patent is extended or adjusted under 35 U.S.C. 154(b) by 583 days.

(21) Appl. No.: 15/755,806

(22) PCT Filed: Aug. 23, 2016

(86) PCT No.: PCT/EP2016/069901
§ 371 (c)(1),
(2) Date: Feb. 27, 2018

(87) PCT Pub. No.: WO2017/036860
PCT Pub. Date: Mar. 9, 2017

(65) Prior Publication Data
US 2018/0326332 A1 Nov. 15, 2018

(30) Foreign Application Priority Data

Aug. 28, 2015 (DE) .......................... 102015114353.4
Sep. 28, 2015 (DE) .......................... 102015116344.6

(51) Int. Cl.
*B01D 35/147* (2006.01)
*B01D 35/153* (2006.01)
(Continued)

(52) U.S. Cl.
CPC ........... *B01D 35/147* (2013.01); *B01D 29/15* (2013.01); *B01D 35/153* (2013.01); *F16K 7/00* (2013.01);
(Continued)

(58) Field of Classification Search
None
See application file for complete search history.

(56) References Cited

U.S. PATENT DOCUMENTS 3,132,097 A * 5/1964 Tietz ...................... B01D 27/08
210/130
3,724,665 A * 4/1973 Hall ..................... B01D 27/103
210/130
(Continued)

FOREIGN PATENT DOCUMENTS

| DE | 102009048588 | 10/2010 |
| DE | 202014104029 | 10/2014 |

(Continued)

OTHER PUBLICATIONS

International Search Report, dated Nov. 24, 2016, priority document.

*Primary Examiner* — Jonathan M Peo
(74) *Attorney, Agent, or Firm* — Greer, Burns & Crain, Ltd.

(57) ABSTRACT

A fluid filter comprises a housing, a fluid inlet and a fluid outlet, a filter element separating a raw side and a clean side from one another, and a valve unit. The valve unit comprises a valve plate arranged concentrically in the housing and having the shape of a circular ring disc, having valve openings and a flexible circular-ring-disc-shaped valve membrane arranged on the valve plate. The filter element comprises an axially protruding pressure-exerting ring shaped as a circumferential annular collar on the end face thereof facing the valve unit when installed. When installed in the housing, the filter element, with an end face of the pressure-exerting ring, presses the valve membrane axially onto the valve plate. The valve membrane, with the membrane region thereof pressed by the pressure-exerting ring (Continued)

onto the valve plate, forms a seal separating the raw side from the clean side of the fluid filter.

15 Claims, 23 Drawing Sheets

(51) Int. Cl.
*B01D 29/15* (2006.01)
*F16K 7/00* (2006.01)
*F01M 11/03* (2006.01)

(52) U.S. Cl.
CPC ............ *B01D 2201/0415* (2013.01); *B01D 2201/0461* (2013.01); *B01D 2201/167* (2013.01); *B01D 2201/291* (2013.01); *F01M 11/03* (2013.01)

(56) References Cited

U.S. PATENT DOCUMENTS

| | | | | |
|---|---|---|---|---|
| 4,872,976 | A * | 10/1989 | Cudaback | ............ B01D 27/103 210/130 |
| 5,395,518 | A * | 3/1995 | Gulsvig | ................ B01D 27/06 210/132 |
| 6,595,372 | B1 | 7/2003 | Minowa et al. | |
| 2002/0023863 | A1 | 2/2002 | Binder et al. | |
| 2006/0131225 | A1* | 6/2006 | Luka | .................... B01D 27/103 210/450 |
| 2016/0146360 | A1* | 5/2016 | Boston | ................ B01D 27/103 210/136 |
| 2016/0220931 | A1 | 8/2016 | Ardes | |

FOREIGN PATENT DOCUMENTS

| | | |
|---|---|---|
| EP | 0972554 | 1/2000 |
| EP | 1177826 | 2/2002 |

* cited by examiner

FLUID FILTER WITH A VALVE UNIT AND FILTER ELEMENT FOR USE IN THE FLUID FILTER

CROSS-REFERENCES TO RELATED APPLICATIONS

This application claims the benefit of the German patent application No. 10 2015 114 353.4 filed on Aug. 28, 2015 and of the German patent application No. 10 2015 116 344.6 filed on Sep. 28, 2015, the entire disclosures of which are incorporated herein by way of reference.

BACKGROUND OF THE INVENTION

The present invention relates to a fluid filter having a housing, having a fluid inlet that opens into a raw side of the fluid filter, and having a fluid outlet that goes out from a clean side of the fluid filter, having an exchangeable hollow cylindrical filter insert that separates the raw side and the clean side from one another, and having a valve unit, the valve unit having a valve plate that is made in the shape of an annular circular disc and is situated concentrically in the housing, the plate having valve openings and having a flexible valve membrane, in the shape of an annular circular disc, situated on the valve plate. Moreover, the present invention relates to a filter insert for use in the fluid filter.

A fluid filter of the type indicated above is known from DE 20 2014 104 029 U1. The known fluid filter has a valve unit having a valve plate and having a valve membrane situated thereon. At its radially inner edge region, the valve membrane is clamped between two components of the filter that are fixedly connected to one another when the filter is manufactured.

Thus, for the mounting of the valve membrane, in the known fluid filter a special component is required that has to be installed in the fluid filter and fixedly connected to the rest of the fluid filter, and which then presses the valve membrane against another component of the fluid filter, thus fixing it.

SUMMARY OF THE INVENTION

For the present invention, an object arises of providing a fluid filter of the type named above in which the number of required components is reduced without impairing function and operational reliability, and in which a simplified assembly of the fluid filter is achieved. Moreover, a filter insert is to be provided for use in the fluid filter.

According to the present invention, a first part of an object of the invention, relating to the fluid filter, is achieved by a fluid filter of the type named above that is characterized in that:

the filter insert has, on its end face facing the valve unit in the installed state, an axially protruding pressure-exerting ring in the form of a peripheral annular collar;

when the filter insert is installed in the housing, this insert presses the valve membrane axially onto the valve plate with an end face of the pressure-exerting ring;

the valve membrane here forms, with its membrane region pressed onto the valve plate by the pressure-exerting ring, a seal that separates the raw side and the clean side of the fluid filter from one another.

Due to the present invention, advantageously a separate component is no longer required for fixing the valve membrane in the fluid filter, and a separate seal between the raw side and clean side of the fluid filter is no longer required, saving production and assembly costs. Advantageously, the function of fixing the valve membrane is now taken over by the filter insert, which is already present anyway in a fluid filter ready for operation. The function of the seal between the raw side and the clean side of the fluid filter is taken over by the valve membrane. When the filter insert is removed from the fluid filter for the purpose of changing the filter insert, it is true that the fixing of the valve membrane and the seal between the raw side and the clean side are temporarily undone, but this is not a disadvantage, because during filter maintenance with a change of filter insert, a valve function of the valve unit with the valve membrane, and also a separation of the raw side and the clean side, are not required. Rather, these functions are required only when a filter insert is situated in the fluid filter and the fluid filter is in operational use.

Preferably, the pressure-exerting ring is connected to or made in one piece with an end disc of the filter insert, which disc faces the valve unit in the installed state of the filter insert, contributing to simple and low-cost production of the filter insert and easy handling.

In addition, for the fluid filter according to the present invention it is provided that it has a central pipe socket and that the valve plate is seated in sealing fashion on the outer periphery of the pipe socket. Given a suitable choice of material and dimensional matching, the valve plate can interact in sealing fashion with the pipe socket without a separate seal and can be held mechanically on the pipe socket, further contributing to simple production and reduction of the number of components required.

In an embodiment of the fluid filter, the valve unit is a filter bypass valve, and when the filter insert is installed in the housing this insert presses the valve membrane, in a radially outer membrane region, onto the valve plate with the pressure-exerting ring. In practice, a very large number of fluid filters have a filter bypass valve in order to ensure an adequate supply to consumption points downstream from the fluid filter even when the filter insert is in place, even if this supply is then of unfiltered fluid. In the fluid filter according to the present invention, such a filter bypass valve can be integrated easily and at low cost.

A development of the fluid filter provides that the pressure-exerting ring forms, with its inner periphery, a radial centering and guide element for a valve body of the filter bypass valve, which valve body is axially displaceable on the pipe socket and is preloaded with a force in the valve closing direction. Here, the pressure-exerting ring has an additional function, which makes a separate guide component for the valve body superfluous.

So that the valve body can reliably perform its function with the simplest possible design, this valve body is preferably formed by a sleeve body whose basic shape is hollow and cylindrical, or by a ring body having a rectangular cross-section. A sleeve body having a hollow cylindrical basic shape provides particularly good axial guiding. A ring body having a rectangular cross-section provides a particularly compact design.

In another embodiment of the fluid filter, the valve unit is a non-return valve, and when the filter insert is installed in the housing, this insert presses the valve membrane onto the valve plate in a radially inner membrane region, with the pressure-exerting ring. In this embodiment of the fluid filter, it is ensured that when the fluid circuit comes to a standstill the fluid cannot run out from the fluid filter, which would be undesirable. In this way, it is ensured that when the fluid circuit is started up, the downstream supply points will be immediately supplied with filtered fluid.

A development of the fluid filter provides that on the side of the valve membrane facing away from the valve plate, there is situated a spring disc having spring tongues pointing outward in the radial direction, and that when the filter insert is installed in the housing, this insert pre-tensions and/or exerts pressure on the spring disc, with the pressure-exerting ring, in the direction towards the valve membrane. Here, the pressure-exerting ring is given an additional function, advantageously achieving a higher degree of integration.

In order to make it possible in the fluid filter to exert pressure on the valve membrane on the one hand and to pre-tension and/or exert pressure on the spring disc on the other hand with the required differences, the present invention proposes that the pressure-exerting ring has on its outer peripheral surface at least one support element that protrudes radially and is axially set back relative to the end face of the pressure-exerting ring, and that pre-tensions and/or exerts pressure on the spring disc in the direction towards the valve membrane, a support element being provided, in particular, in the form of a web that runs around in the peripheral direction, or in the form of a plurality of support elements situated at a distance from one another in the peripheral direction, in the form of cams or of ribs or webs that run in the axial or peripheral direction.

In order to secure the valve membrane and the spring plate against loss when the filter insert is removed, it is provided that the spring plate is connected at points to the valve plate with interposition of the valve membrane.

In a further embodiment in this regard, it is proposed that two or more retaining pins extend from the valve plate in the direction toward the spring disc, and that the spring plate has two or more retaining holes situated so as to positionally align with the retaining pins, in which holes the retaining pins engage. In this way, the spring disc is centered relative to the valve plate and is positioned in the peripheral direction. During assembly of the fluid filter, in this way the spring disc can easily be set onto the guide pins in the axial direction, keeping assembly simple.

In order to ensure an adequate hold here, the spring disc is usefully pressed or clamped onto the retaining pins with its retaining holes. Once the spring disc has been pressed or clamped onto the guide pins, it can no longer detach from the guide pins by itself.

For reliable functioning of the non-return valve, it is important that the spring tongues of the spring disc are not bent or otherwise damaged by external influences. For this reason, according to the present invention it is provided that the spring disc has a protective ring made in one piece with the disc and surrounding the spring tongues radially externally, and/or that a protective collar that surrounds the spring tongues of the spring disc radially externally is situated on the valve plate.

As explained above, the valve unit of the fluid filter can be a filter bypass valve or a non-return valve. In an advantageous further embodiment, the fluid filter has two valves, the valve unit having a filter bypass valve, and having a non-return valve. For the manufacture of the various embodiments of the fluid filter with regard to the valves, in each case only slight modifications to the components are required, which is advantageous with regard to production costs.

A further development of the fluid filter described above provides that the valve plate and the flexible valve membrane are each both a part of the filter bypass valve and also a part of the non-return valve, and that when the filter insert is installed in the housing this insert presses the valve membrane against the valve plate in a radial membrane intermediate region, with the pressure-exerting ring situated on the insert. This embodiment is a particularly effective measure for reducing the number of components, because the valve plate and the flexible valve membrane are each both a part of the filter bypass valve and a part of the non-return valve. When the filter insert is installed in the housing, this insert presses the valve membrane against the valve plate in a radial intermediate region, with the pressure-exerting ring situated on the insert. Preferably, here the radially inner regions of the valve plate and valve membrane are assigned to the filter bypass valve and the radially external regions of the valve plate and valve membrane are assigned to the non-return valve. Through the exertion of pressure on the valve membrane in its radial intermediate region between the filter bypass valve and the non-return valve, the radially inner region and the radially outer region of the valve membrane act like two valve membranes independent of each other. At the same time, the pressure-exerting ring and the valve membrane, in their interaction, advantageously form the required seal and separation between the raw side and clean side of the fluid filter, without requiring separate sealing means for this purpose.

So that, independently of dimensional tolerances in its manufacturing and of changes in dimensions during operation, the filter insert always presses the valve membrane onto the valve plate reliably with its pressure-exerting ring, and if warranted also pre-tensions and/or exerts pressure on the spring disc, it is preferably provided that an axially springy component is situated between the housing and the filter insert that, in the installed state of the filter insert, exerts a force on the filter insert acting in the direction toward the valve plate.

In a preferred development in this regard, the axially springy component is a mesh-shaped supporting body situated in the interior of the filter insert, which, in the installed state of the filter insert, is supported with its one end on the housing and with its other end on the filter insert. As a rule, a supporting body is provided anyway in hollow cylindrical filter inserts as a protection against collapsing, so that the use of the supporting body as a springy component offers an additional benefit without the expense of an additional component.

In order to achieve the second part of the object of the invention, relating to the filter insert, according to the present invention a filter insert is proposed for use in the fluid filter, the filter insert being characterized in that it has a pressure-exerting ring in the form of a peripheral annular collar on its end face facing the valve unit in the installed state, such that when the filter insert is installed in the housing the valve membrane can be pressed against the valve plate by the pressure-exerting ring so as to separate the raw side and clean side of the fluid filter from one another.

The filter insert according to the present invention has the specific means, in particular the pressure-exerting ring, that make it suitable for use in the fluid filter according to the present invention and for interacting with the valve membrane of the valve unit situated therein.

Preferably, for the purpose of easy and low-cost production the pressure-exerting ring is connected to, or made in one piece with, an end disc of the filter insert that faces the valve unit in the installed state of the filter insert.

If, in addition to the function of exerting pressure on the valve membrane, the filter insert is also to take over the function of pre-tensioning and/or exerting pressure on a spring disc of the valve unit, it is then preferably provided that the pressure-exerting ring has on its outer peripheral surface at least one support element that protrudes radially and is axially set back relative to the end face of the pressure-exerting ring, which support element, in the installed state of the filter insert, can pre-tension the spring disc and/or can exert pressure on it in the direction toward the valve membrane.

In a further embodiment of the filter insert in this regard, a support element is provided in the form of a web that runs around in the peripheral direction, or a plurality of support elements are provided in the form of cams or of ribs or webs that run in the axial or peripheral direction. The support elements in the named embodiments are functionally reliable, and are easy to produce with regard to their shape and can therefore be produced at low cost.

Finally, for the filter insert according to the present invention it is provided that in the interior of the filter insert there is situated a mesh-shaped supporting body that forms an axially springy component that, in the installed state of the filter insert, is capable of being supported with its one end on the housing and with its other end on the filter insert.

In the following, exemplary embodiments of the present invention are explained on the basis of a drawing.

DETAILED DESCRIPTION OF THE PREFERRED EMBODIMENTS

Figure 1:
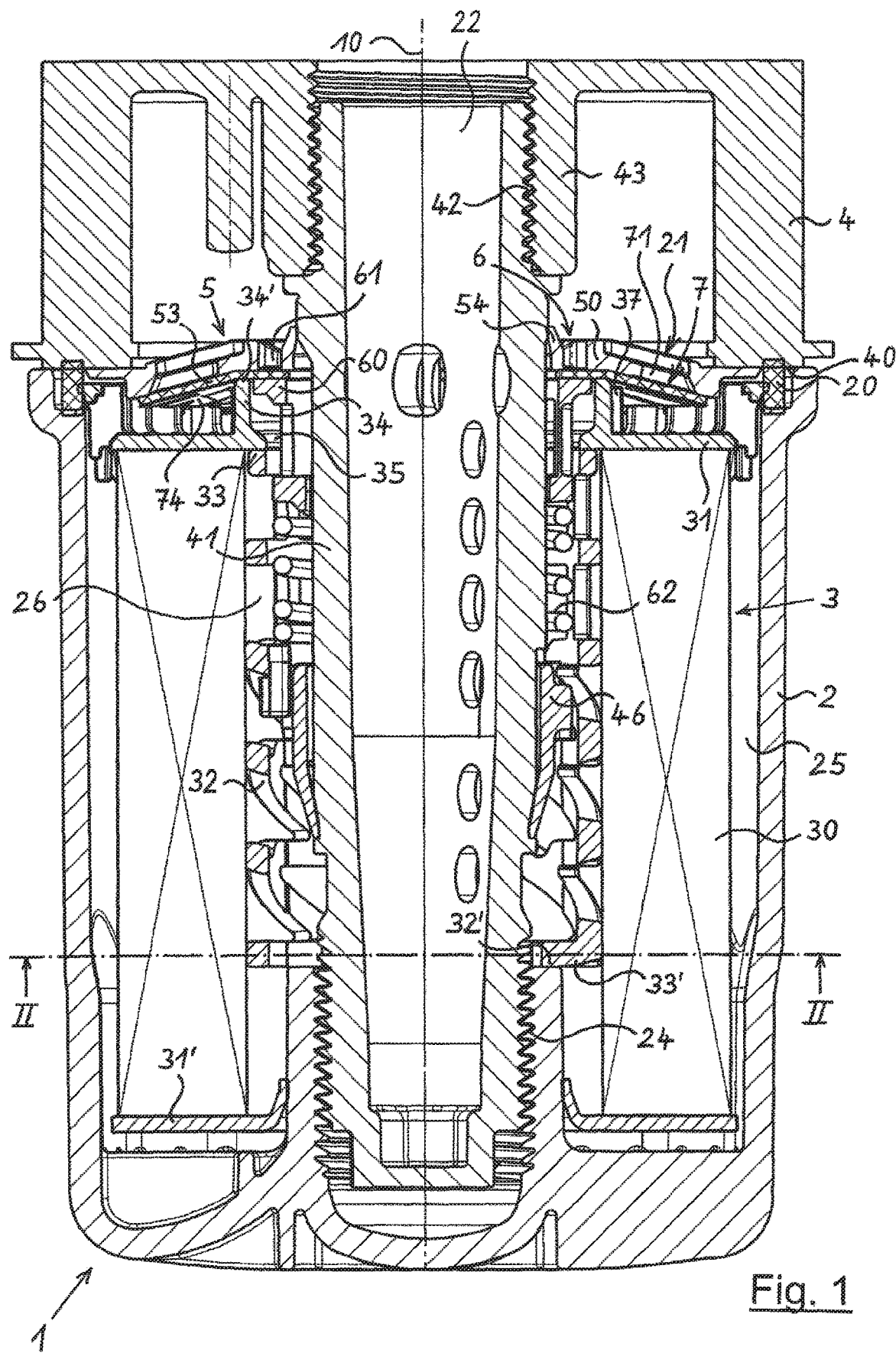
FIG. 1 shows a complete fluid filter having a filter insert and valve unit, in a state installed on a connecting flange, in a longitudinal section according to the sectional line I-I in FIG. 2.

In the following description of the Figures, identical parts in the various drawings are always provided with the same reference characters, so that reference characters do not have to be explained again for each drawing.

Figure 2:
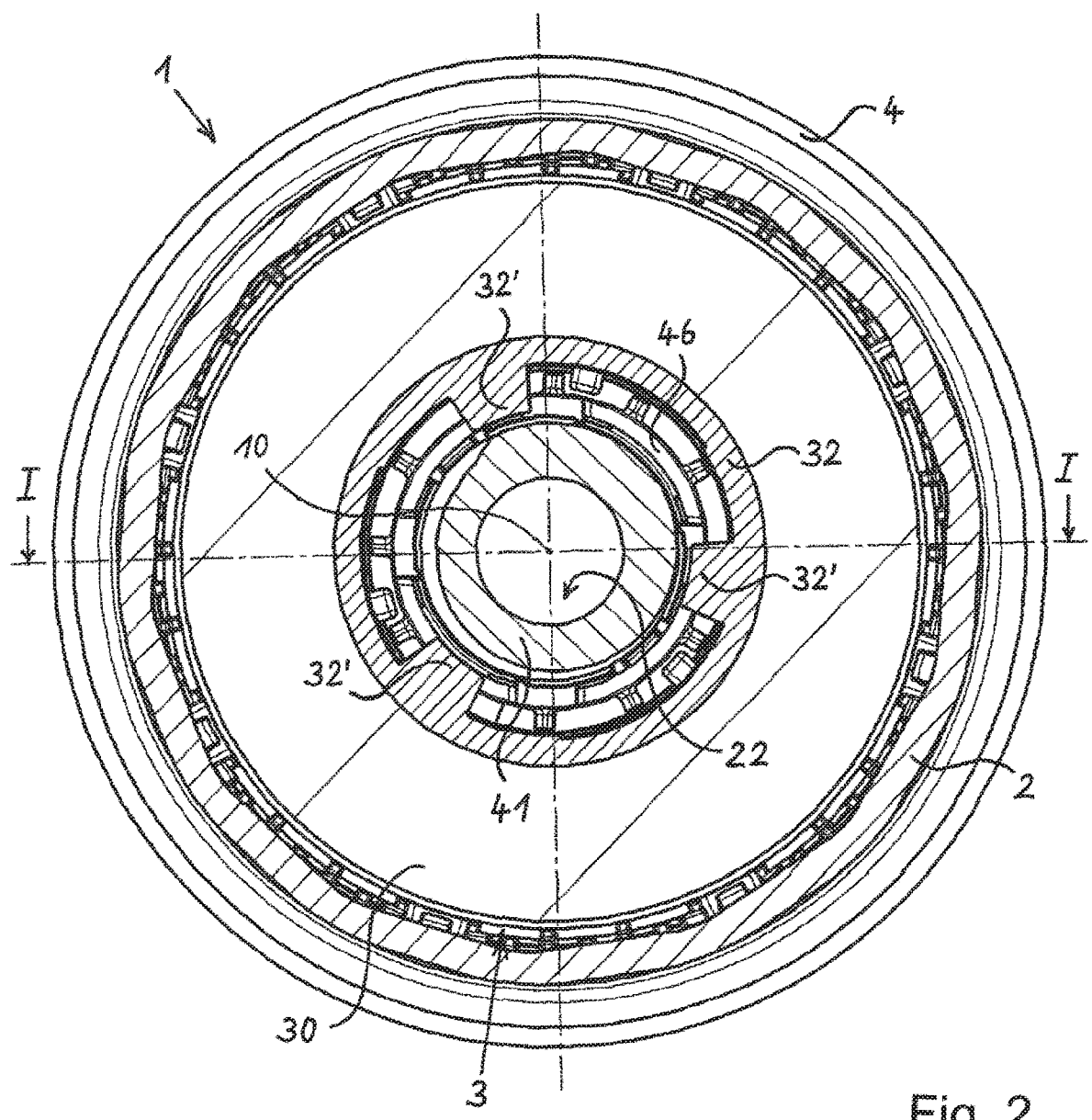
FIG. 2 shows the fluid filter of FIG. 1 in cross-section according to the sectional line II-II in FIG. 1.

FIG. 1 shows a complete fluid filter 1 having a filter insert 3 and a valve unit 5, in a state installed on a connecting flange 4, in a longitudinal section according to sectional line I-I in FIG. 2. Here, fluid filter 1 is realized as a so-called "suspended" filter, which means that in its mounted state it points downward from connecting flange 4. When, in the following, indications such as "at top" and "at bottom" are used, these however relate only to the depicted exemplary embodiment. Independently thereof, fluid filter 1 is capable of functioning in any spatial position and orientation.

Here, connecting flange 4 has a central threaded socket into which a central pipe socket 41 is screwed by a screw connection 42. By means of a further screw connection 24, a housing 2 is screwed to the axially outer (at bottom according to FIG. 1) end of pipe socket 41. By means of an annular seal 20 situated on the end face at the flange side, housing 2 is sealed against a sealing surface 40 of connecting flange 4. Longitudinal mid-axis 10 of fluid filter 1 runs centrally through fluid filter 1, and fluid filter 1 is made essentially rotationally symmetrical relative to this axis.

In the interior of housing 2, filter insert 3 is situated so as to surround central pipe socket 41. Filter insert 3 is made up of a hollow cylindrical filter material body 30, made for example of folded filter paper, and two end discs 31, 31' that enclose filter material body 30 at the ends. The two end discs 31, 31' are each made with a respective central opening. First end disc 31, close to the connecting flange, surrounds pipe socket 41 with its central opening 35, with a radial spacing. Second end disc 31', remote from the connecting flange, works together with housing 2 in sealing fashion at its central opening.

Radially externally from filter insert 3 is situated a raw side 25 of fluid filter 1; radially inwardly from filter insert 3 there is situated a clean side 26 of fluid filter 1. During operation of fluid filter 1, a fluid to be filtered, such as lubricant oil or flow of an internal combustion engine, can be guided through a fluid inlet 21, situated radially externally, to raw side 25 of fluid filter 1. After flowing through filter material body 30 of filter insert 3 in the radial direction from the outside to the inside, the now-filtered fluid reaches clean side 26 of fluid filter 1. From there, the fluid flows through a central fluid outlet 22 that runs through the interior of pipe socket 41, for example to lubrication points or to a fuel injection system of an internal combustion engine.

In the interior of filter insert 3 there is situated a support body 32 whose basic shape is hollow and cylindrical, and which supports filter material body 30 from collapsing when there is a flow in the radial direction from the outside to the inside during operation of fluid filter 1. In addition, here supporting body 32 has a function as an axially springy component, described in more detail below.

In its region facing connecting flange 4, at top in FIG. 1, fluid filter 1 has a valve unit 5. Valve unit 5 has a valve plate 50 whose basic shape is that of a circular annular disc, which is placed in sealing fashion on the outer periphery of central pipe socket 41 with its sealing lip 54 situated on its inner periphery.

In addition, valve unit 5 has an elastic-flexible valve membrane 53 in the shape of a circular annular disc, situated on the side of valve plate 50 pointing away from connecting flange 4. Valve membrane 53 is held in its position on valve plate 50 by a pressure-exerting ring 34, which here is a one-piece part of end disc 31 of filter insert 3. Here, an axially outer end face 34' of pressure-exerting ring 34 presses valve membrane 53 onto valve plate 50 along a circular line. At the same time, in this way raw side 25 is separated from clean side 26 of fluid filter 1.

The exerted pressure force for pressure-exerting ring 34 is produced by support body 32, which forms a springy component, in the interior of filter insert 3. For this purpose, supporting body 32 is axially supported on end disc 31 with its end 33 facing end disc 31. The other end 33', facing away from valve unit 5, of springy support body 32 is axially supported radially inwardly on housing 2 in the region of screw connection 24, by means of support lugs 32'. In its de-tensioned state, support body 32 is longer than in its pre-tensioned state shown in FIG. 1. Thus, in the state of housing 2 in which it is screwed together with central pipe socket 41, an axial force is transferred from housing 2 via the axially springy compressed supporting body 32 onto end disc 31, and to pressure-exerting ring 34 connected in one piece to the end disc, in order to reliably and permanently press valve membrane 53 onto valve plate 50 by means of end face 34' of pressure-exerting ring 34.

In the exemplary embodiment shown in FIG. 1, valve unit 5 includes two valves, namely, radially inwardly, a filter bypass valve 6 and, radially outwardly, a non-return valve 7.

Filter bypass valve 6 is formed by valve openings 61 in the radially inner region of valve plate 50, by a radially inner part of valve membrane 53, by a valve body 60 guided so as to be movable axially in the interior of pressure-exerting ring 34, and by a valve spring 62 that pre-loads valve body 60 in the closing direction. At its end facing away from valve body 60, valve spring 62 is axially supported on a spring support 46 that is placed onto the outer periphery of central pipe socket 41 and is secured against displacement away from valve unit 5.

Non-return valve 7 is formed by valve openings 71 in the radially outer region of valve plate 50, by a radially external part of valve membrane 53, and by a spring disc 74. Spring disc 74 is situated with a radially inner region under support elements 37 that are situated at regular distances on the outer periphery of pressure-exerting ring 34 and are set back somewhat relative to end face 34' of the pressure-exerting ring. By means of support elements 37, spring disc 74 is pre-tensioned in its radially inner region and/or is pressed onto valve membrane 53. Radially further outward, spring disc 74 has flexible spring tongues 75 that can be deflected against an inherent resetting force together with the radially outer part of valve membrane 53, in a direction away from valve plate 50.

FIG. 2 shows fluid filter 1 of FIG. 1 in cross-section according to the sectional line II-II in FIG. 1. Radially outwardly, a small part of connecting flange 4 is visible. Radially inward therefrom, housing 2 is visible in section. Radially inward therefrom, there is situated filter insert 3 with filter material body 30, here shown in section. In the interior of filter material body 30 there is situated support body 32, which has radially inward-protruding support lugs 32' close to its end facing the observer in FIG. 2. With these support lugs 32', support body 32 is supported at its end 33' on housing 2 in the region of screw connection 24, as is visible in FIG. 1.

In the center of FIG. 2, central pipe socket 41 is sectioned; fluid outlet 22 runs through its interior. Between the outer periphery of pipe socket 41 and the inner periphery of support body 32, some segments of spring support 46 are visible.

Figure 3:
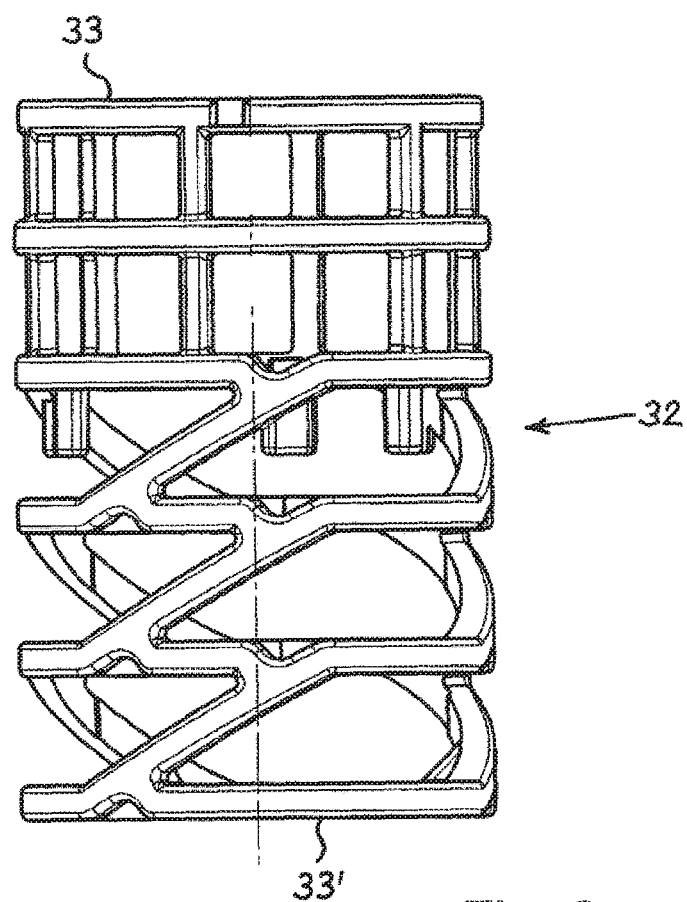
FIG. 3 shows a supporting body of the filter insert of FIG. 1 in a side view.

FIG. 3 shows a support body 32 of filter insert 3 of FIG. 1 in a side view. Here it is clearly visible that support body 32 is realized in the manner of an axially compressible spring, at least over the lower part of its height, in order to act as a springy component as explained above. At the same time, support body 32, in its state situated in the interior of filter material body 30, supports the filter material body against collapse during operation. Due to its mesh structure, support body 32 here does not present any significant flow resistance to the fluid flowing through filter material body 30.

Figure 4:
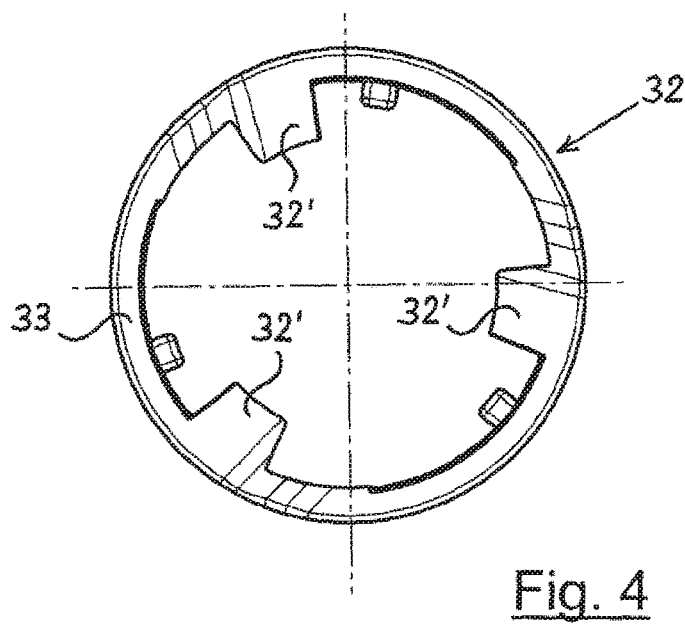
FIG. 4 shows the supporting body of FIG. 3 in a top view.

FIG. 4 shows support body 32 of FIG. 3 in a top view, in which support lugs 32' are clearly visible, configured so as to point radially inward at end 33 of support body 32.

Figure 5:
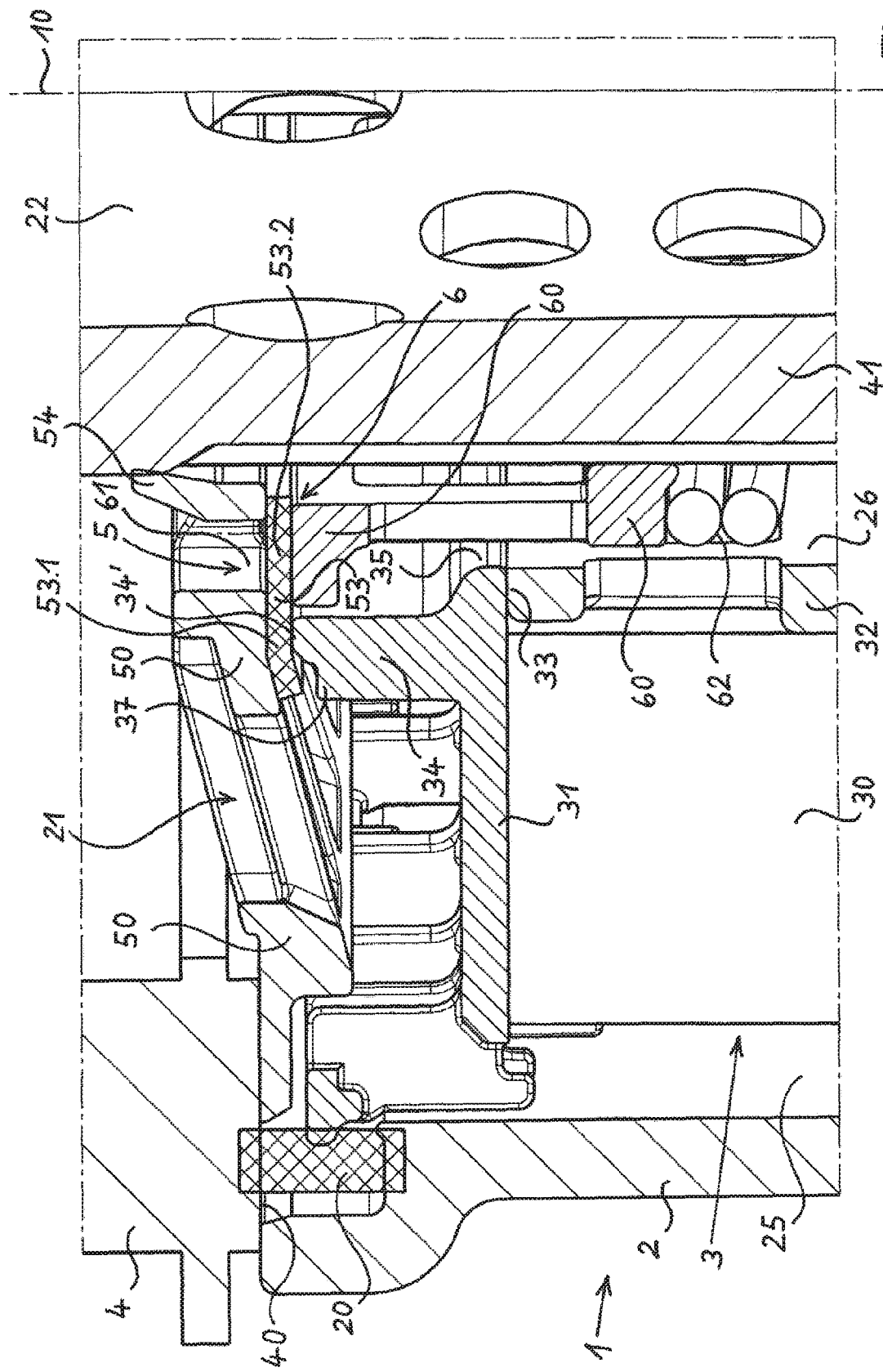
FIG. 5 shows a first valve unit having a filter bypass valve in the closed position, in an enlarged partial longitudinal section.

FIG. 5 shows a first valve unit 5 having a filter bypass valve 6 in the closed position, in an enlarged partial longitudinal section. At the far right in FIG. 5, longitudinal mid-axis 10 of fluid filter 1 runs through central pipe socket 41. At the far left in FIG. 5, a part of housing 2 is visible. In the interior of housing 2, an upper part of filter insert 3 can be seen with its upper end disc 31 and pressure-exerting ring 34 integrally formed in one piece thereon.

At top in FIG. 5, first valve unit 5 is shown in an enlarged representation, here including only filter bypass valve 6. The part of valve unit 5 that is at the top in FIG. 5 forms valve plate 50, which is placed with its radially inner sealing lip 54 in sealing fashion on the outer periphery of central pipe socket 41. Radially externally, a flat edge region of valve plate 50 is situated on sealing surface 40 of connecting flange 4 in order to position valve plate 50 in an axially defined position relative to pipe socket 41.

On the side of valve plate 50 pointing downward in FIG. 5, a valve membrane 53 is situated in the radially inner region of the valve plate. In its radially outer region 53.1, valve membrane 53 is pressed against valve plate 50, and thus fixed, by end face 34' of pressure-exerting ring 34. A radially inner region 53.2 of valve membrane 53 forms a part of filter bypass valve 6 and works together with a valve body 60 that is guided in axially displaceable fashion in the interior of pressure-exerting ring 34 and on the outer periphery of pipe socket 41. By means of valve spring 62, which surrounds pipe socket 41 in the form of a helical pressure spring, valve body 60 is pre-loaded in the closing direction of filter bypass valve 6. In the closed position, as shown in FIG. 5, valve body 60 presses the radially inner region 53.2 of valve membrane 53 against the radially inner part of valve plate 50, and thus closes valve openings 61 of filter bypass valve 6 in valve plate 50.

The supply of fluid to be filtered takes place radially externally through fluid inlet 21 to raw side 25 of fluid filter 1. The flowing out of filtered fluid from clean side 26 of fluid filter 1 takes place through fluid outlet 22, which runs through the interior of pipe socket 41.

Figure 6:
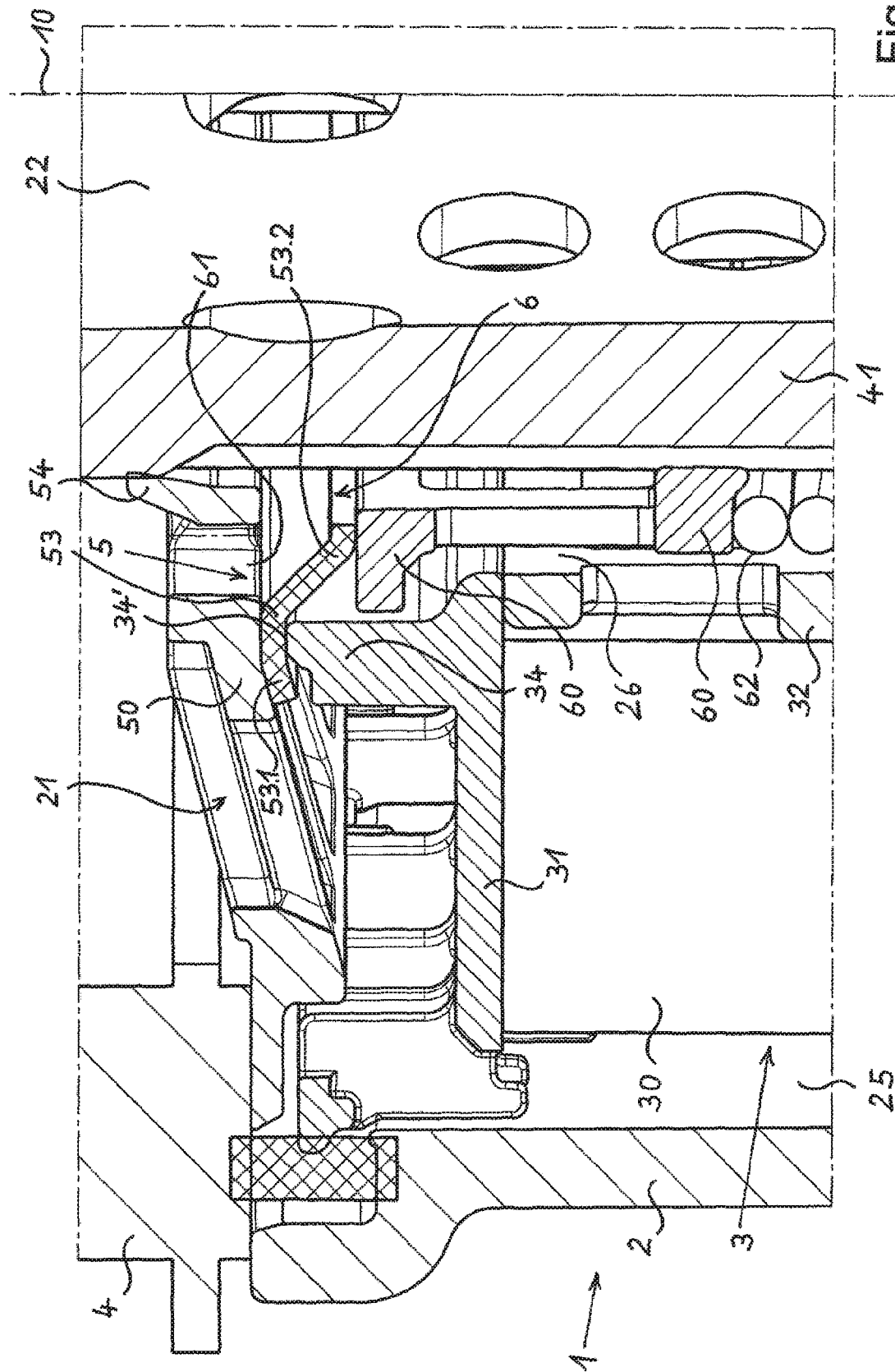
FIG. 6 shows the valve unit of FIG. 5 with the filter bypass valve in the open position, in an enlarged partial longitudinal section.

When, during operation of fluid filter 1, there occurs an increased flow resistance for the fluid, for example as a result of filter material body 30 becoming clogged with dirt particles and/or due to viscosity of the fluid at low temperatures, the fluid pressure at raw side 25 is able to lift the radially inner region 53.2 of valve membrane 53 and valve body 60 off of valve plate 50 against the force of valve spring 62, thus releasing valve openings 61. In FIG. 6, valve unit 5 of FIG. 5, with filter bypass valve 6, is shown in this open position in an enlarged partial longitudinal section. In this functional state, an immediate flow connection, surrounding filter material body 30, is released for the fluid from raw side 25 to clean side 26.

Figure 7:
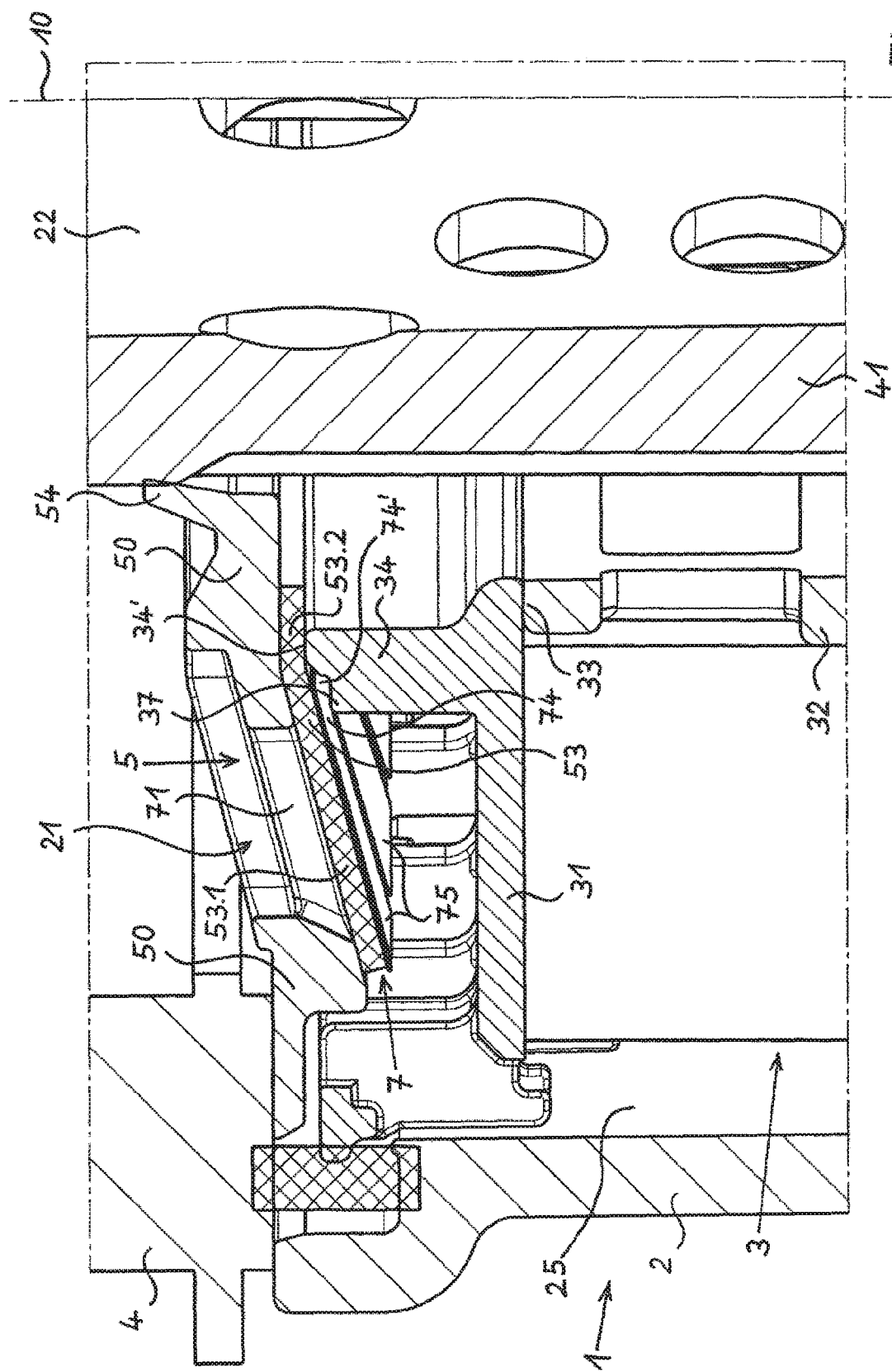
FIG. 7 shows a second valve unit having a non-return valve in the closed position, in an enlarged partial longitudinal section.

FIG. 7 shows a second valve unit 5 having a non-return valve 7 in the closed position, in an enlarged partial longitudinal section. Here as well, valve unit 5 again has valve plate 50, which is again seated in sealing fashion on central pipe socket 41 with its radially inner sealing lip 54, and which plate is here provided only with valve openings 71 for non-return valve 7. On the underside of valve plate 50 there is again situated a valve membrane 53 whose radially outer region 53.1 forms a part of non-return valve 7, and whose radially inner region 53.2 is pressed onto valve plate 50 by pressure-exerting ring 34, by the end face 34' thereof.

On the side of valve membrane 53 facing away from valve plate 50, spring disc 74 is situated, which lies at its radially inner region 74' under support elements 37 on the outer periphery of pressure-exerting ring 34, and is pre-tensioned and/or pressed onto valve membrane 53 by the ring. In its radially outer region, spring disc 74 has spring tongues 75. When fluid filter 1 is out of operation, spring tongues 75 provide a sealing seat of valve membrane 53 on valve plate 50, thus closing valve openings 71 and preventing fluid filter 1 from running empty.

Figure 8:
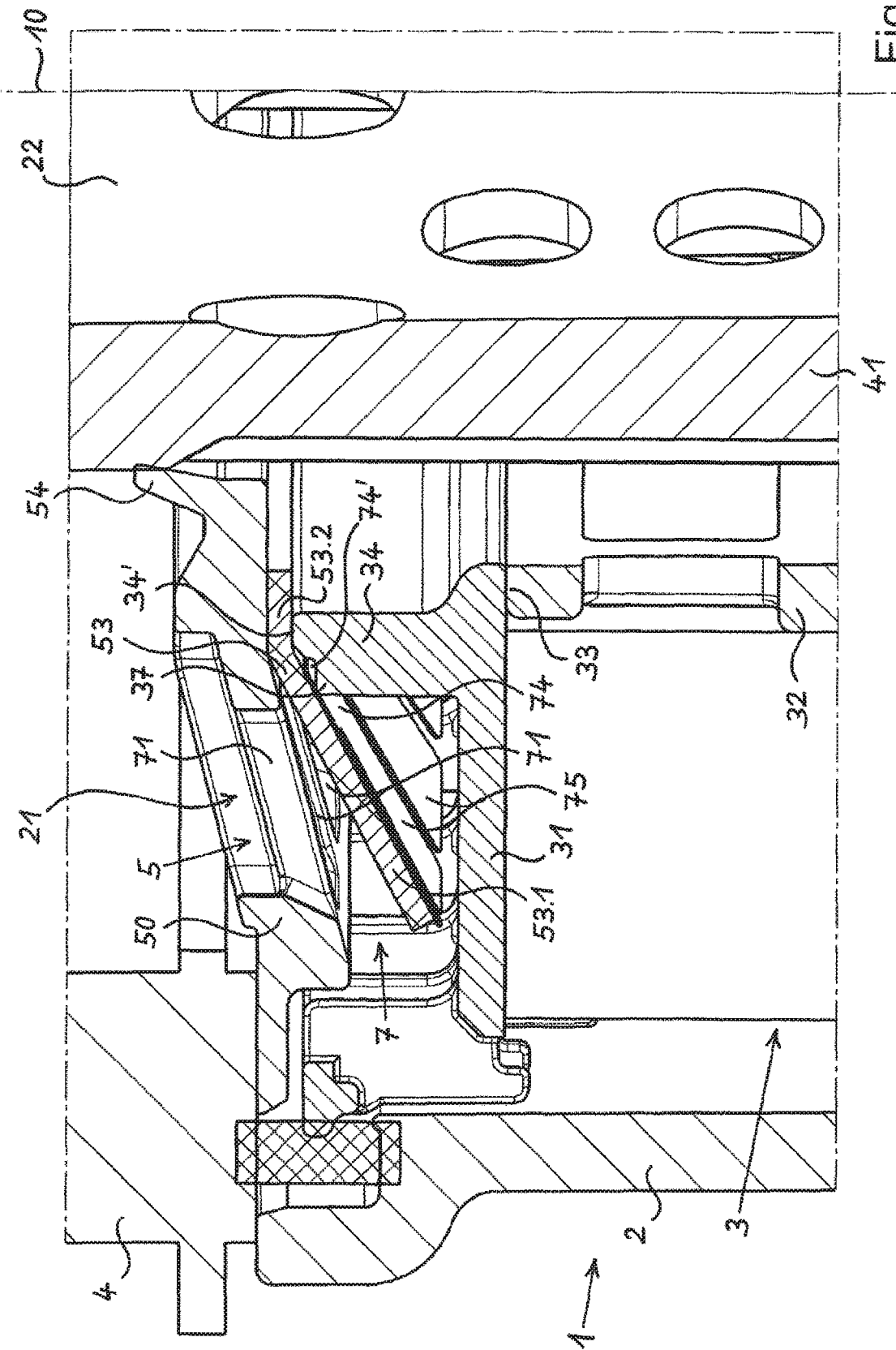
FIG. 8 shows the valve unit of FIG. 7 with the non-return valve in the open position, in an enlarged partial longitudinal section.

FIG. 8 shows valve unit 5 of FIG. 7 with non-return valve 7 in the open position, in an enlarged partial longitudinal section. Non-return valve 7 assumes this position during running operation of fluid filter 1, when fluid to be filtered, supplied via a fluid inlet 21, flows through open valve openings 71 in valve plate 50 to raw side 25 of fluid filter 1. In this operating state, the fluid, supplied under pressure, deflects radially outer region 53.1 of valve membrane 53 and spring tongues 75 in a direction away from valve plate 50, against the inherent resetting force of spring tongues 75 of spring disc 74.

Figure 9:
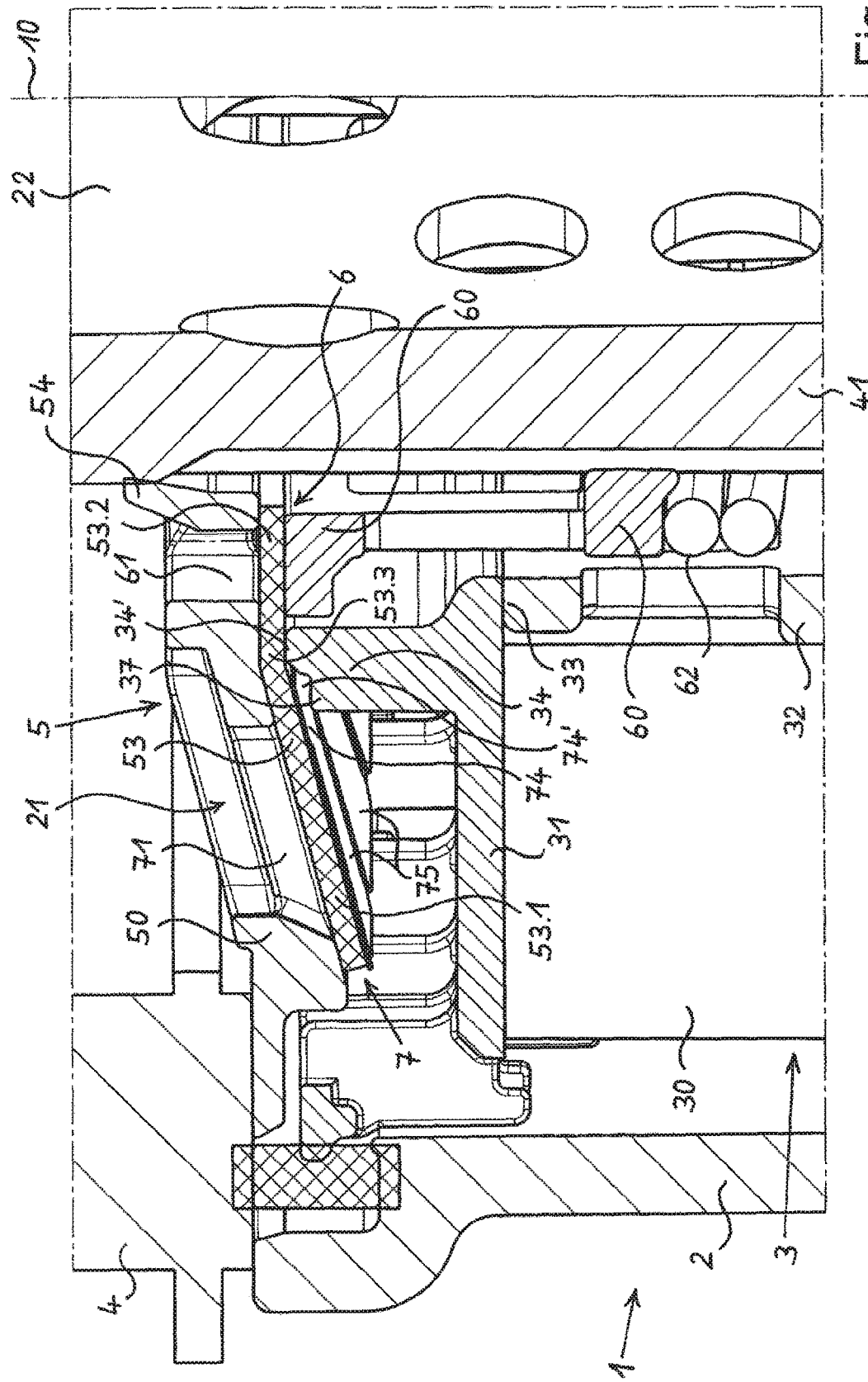
FIG. 9 shows a third valve unit having a filter bypass valve and a non-return valve, both in the closed position, in an enlarged partial longitudinal section.

FIG. 9 shows a third valve unit 5 having a filter bypass valve 6 and a non-return valve 7, as is shown in the exemplary embodiment of fluid filter 1 in FIG. 1, with both valves 6, 7 in the closed position, in an enlarged partial longitudinal section.

Valve plate 50 is here again placed in sealing fashion on the outer periphery of central pipe socket 41 by means of its sealing lip 54, and has, in its radially inner region, valve openings 61 for filter bypass valve 6, and in its radially outer region has valve openings 71 for non-return valve 7. Valve membrane 53 is here assigned to both valves 6, 7. A radially outer region 53.1 of valve membrane 53 forms a part of non-return valve 7. A radially inner (here) region 53.2 of valve membrane 53 is a part of filter bypass valve 6. In a radial intermediate region 53.3 between membrane regions 53.1 and 53.2, valve membrane 53 is pressed onto valve plate 50, and thus fixed, by pressure-exerting ring 34 on end disc 31.

The two valves 6, 7 correspond to the embodiments described above of filter bypass valve 6 and non-return valve 7, to whose description reference is made. In FIG. 9, both filter bypass valve 6 and non-return valve 7 are shown in the closed position.

Figure 10:
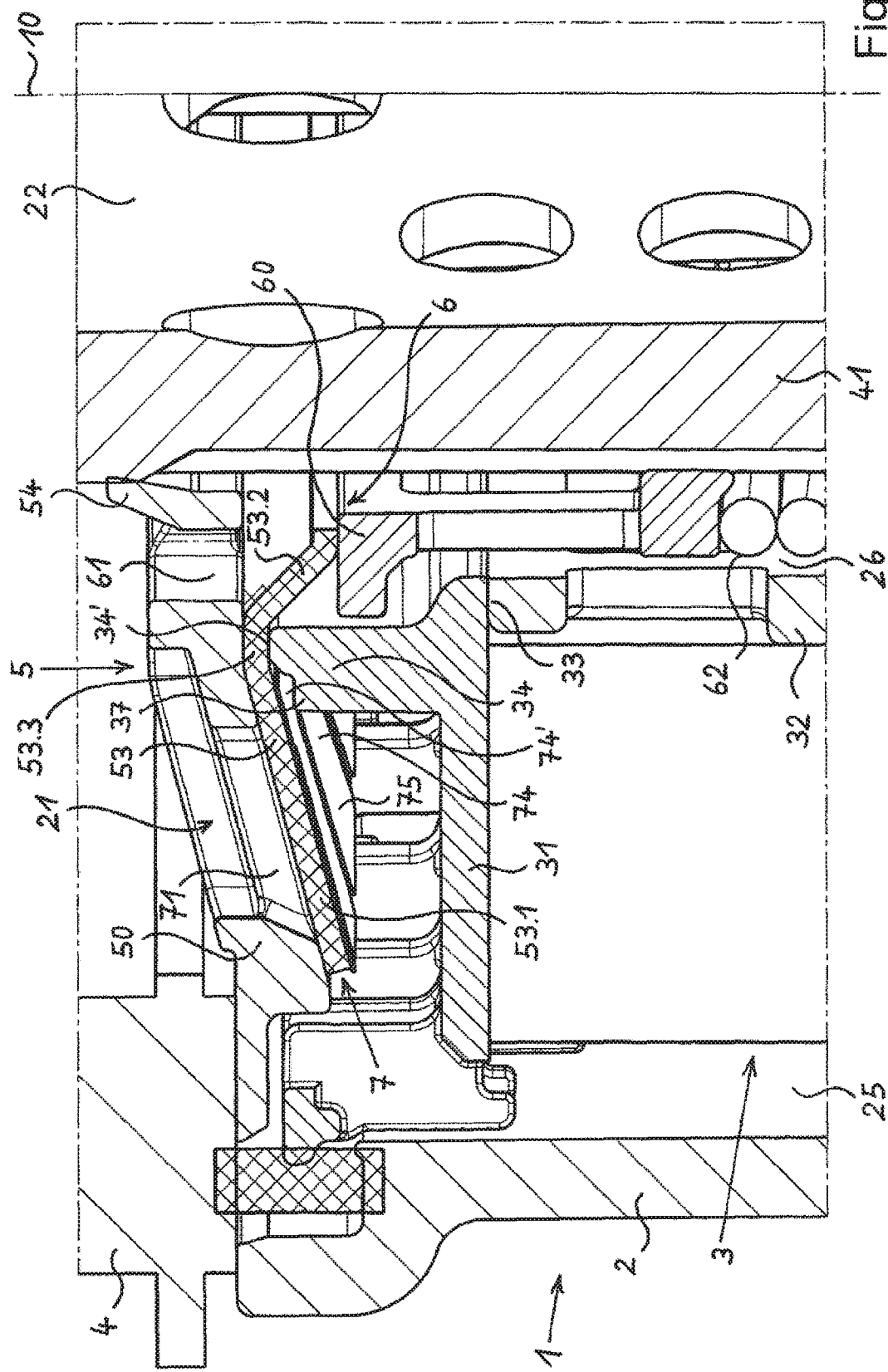
FIG. 10 shows the valve unit of FIG. 9 having the filter bypass valve in the open position and the non-return valve in the closed position, in an enlarged partial longitudinal section.

FIG. 10 shows valve unit 5 of FIG. 9 with filter bypass valve 6 in the open position and non-return valve 7 in the closed position, in an enlarged partial longitudinal section. On the basis of a differential pressure exceeding a specifiable boundary value between raw side 25 and clean side 26, e.g., due to a clogged filter insert 3, no fluid is flowing through filter insert 3; rather, the fluid now flows through open filter bypass valve 6, which is opened by the fluid pressure against the force of valve spring 62. An immediate flow path is now released for the fluid from fluid inlet 21 and raw side 25 through open valve openings 61 to clean side 26 and to fluid outlet 22.

Figure 11:
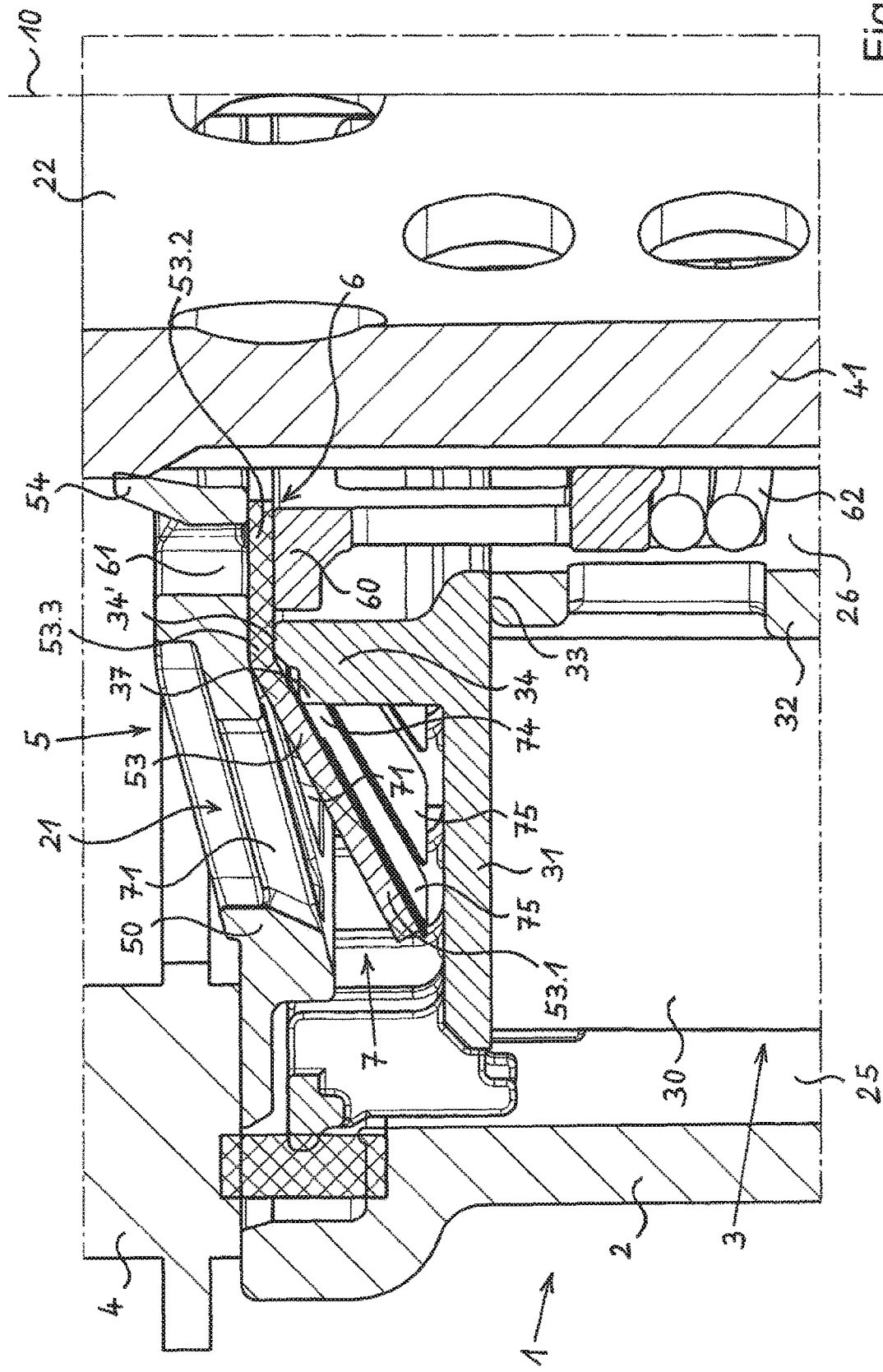
FIG. 11 shows the valve unit of FIG. 9 with the filter bypass valve in the closed position and the non-return valve in the open position, in an enlarged partial longitudinal section.

FIG. 11 shows valve unit 5 of FIG. 9 with filter bypass valve 6 in the closed position and non-return valve 7 in the open position, in an enlarged partial longitudinal section. This state of valve unit 5 occurs during normal operation of fluid filter 1, when fluid that is to be filtered and is under pressure is conveyed through fluid inlet 21 to raw side 25, and then flows from there through filter material body 30 to clean side 26.

Figure 12:
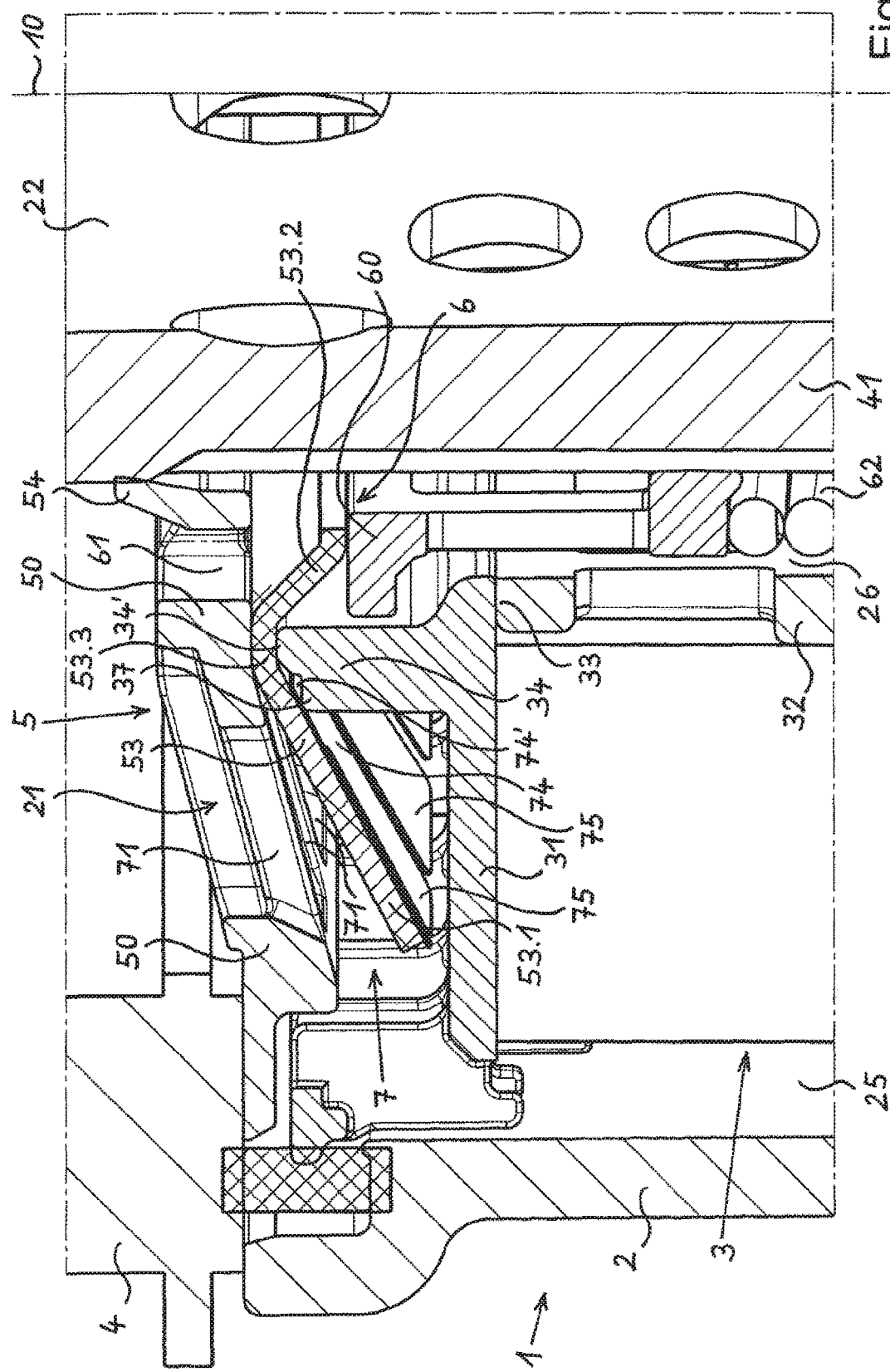
FIG. 12 shows the valve unit of FIG. 9 with the filter bypass valve and the non-return valve in the open position, in an enlarged partial longitudinal section.

FIG. 12 shows valve unit 5 of FIG. 9 with filter bypass valve 6 and non-return valve 7 in the open position, in an enlarged partial longitudinal section. An operating state of fluid filter 1 according to FIG. 12 can occur when filter insert 3 has an increased flow resistance, but is still partially permeable for the fluid. In this case, there results a bifurcated fluid flow, a first partial stream flowing from fluid inlet 21 through open non-return valve 7 to raw side 25 and through filter material body 30 to clean side 26, and a second partial stream flowing from fluid inlet 21 through filter bypass valve 6, which is opened against the force of valve spring 62, and immediately to clean side 26.

Here, valve membrane 53 is pressed onto valve plate 50 in its radial intermediate region 53.3 by end face 34' of pressure-exerting ring 34. Radially outer region 53.1 of valve membrane 53 and radially inner region 53.2 of valve membrane 53 can move independently of each other and do not mutually influence one another, although they are part of the same valve membrane 53. In this way, a mutually independent functioning is ensured of filter bypass valve 6 and non-return valve 7.

Figure 13:
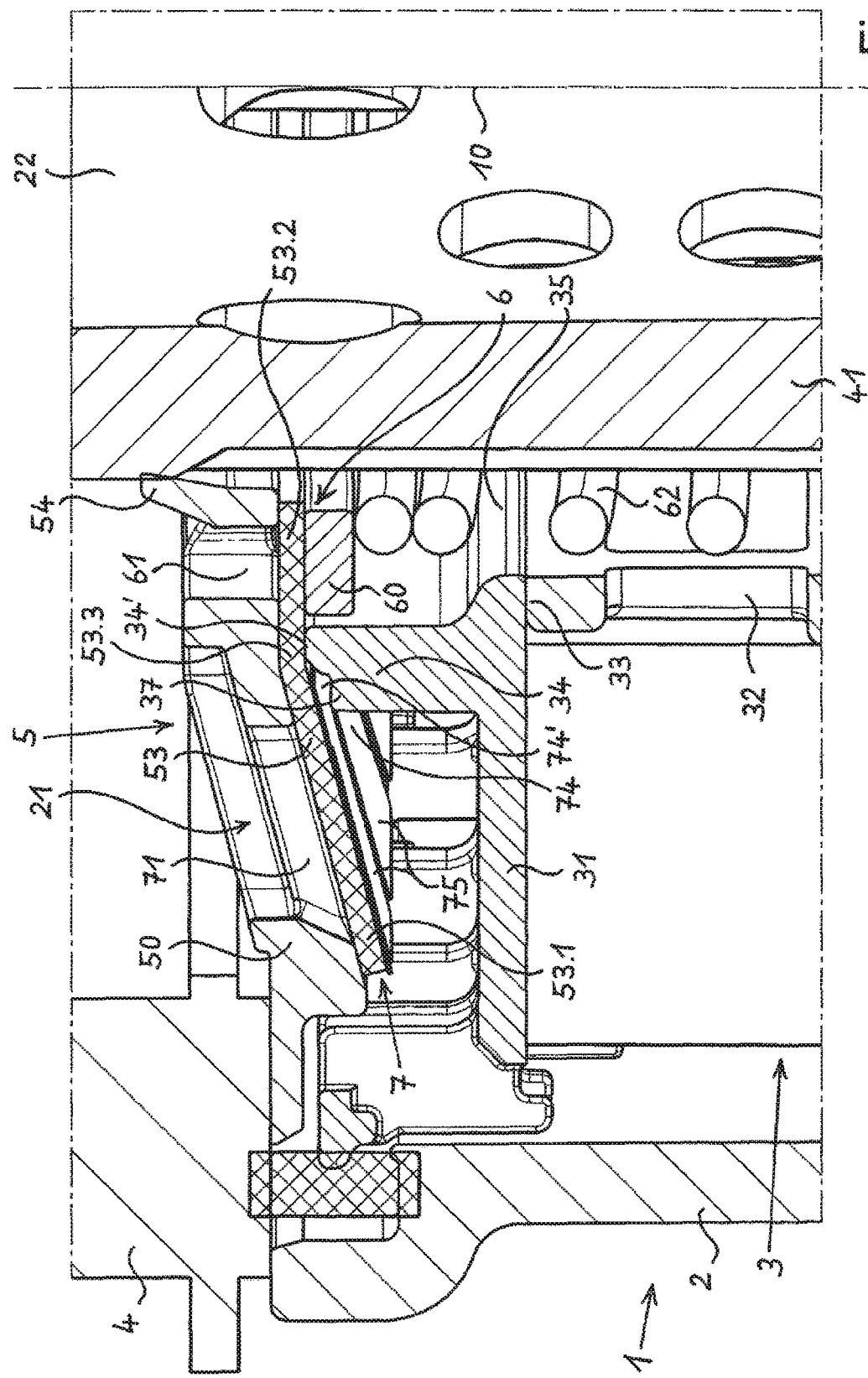
FIG. 13 shows a fourth valve unit having a valve body modified relative to FIG. 9 of the filter bypass valve, with the filter bypass valve and the non-return valve in the closed position, in an enlarged partial longitudinal section.

FIG. 13 shows a fourth valve unit 5 having a valve body 60 of filter bypass valve 6 that is modified relative to FIG. 9, with filter bypass valve 6 and non-return valve 7 in the closed position, in an enlarged partial longitudinal section. Here, valve body 60 is not realized as a body whose basic shape is sleeve-shaped, as in the previous suspended embodiments, but rather is realized as a simple flat ring having a rectangular cross-section. With its upper (in FIG. 13) flat side, annular valve body 60 works together with radially inner region 53.2 of valve membrane 53. The upper end of valve spring 62 lies against the downward-pointing (in FIG. 13) flat side of valve body 60. Here, valve body 60 is guided essentially with its radially outer periphery on the inner periphery of pressure-exerting ring 34, so that a disturbing tilting or clamping of valve body 60 is avoided, despite its low axial constructive height.

In its further details and functions, fluid filter 1 in FIG. 13 corresponds to the example of FIGS. 9 through 12, to whose description reference is made.

Figure 14:
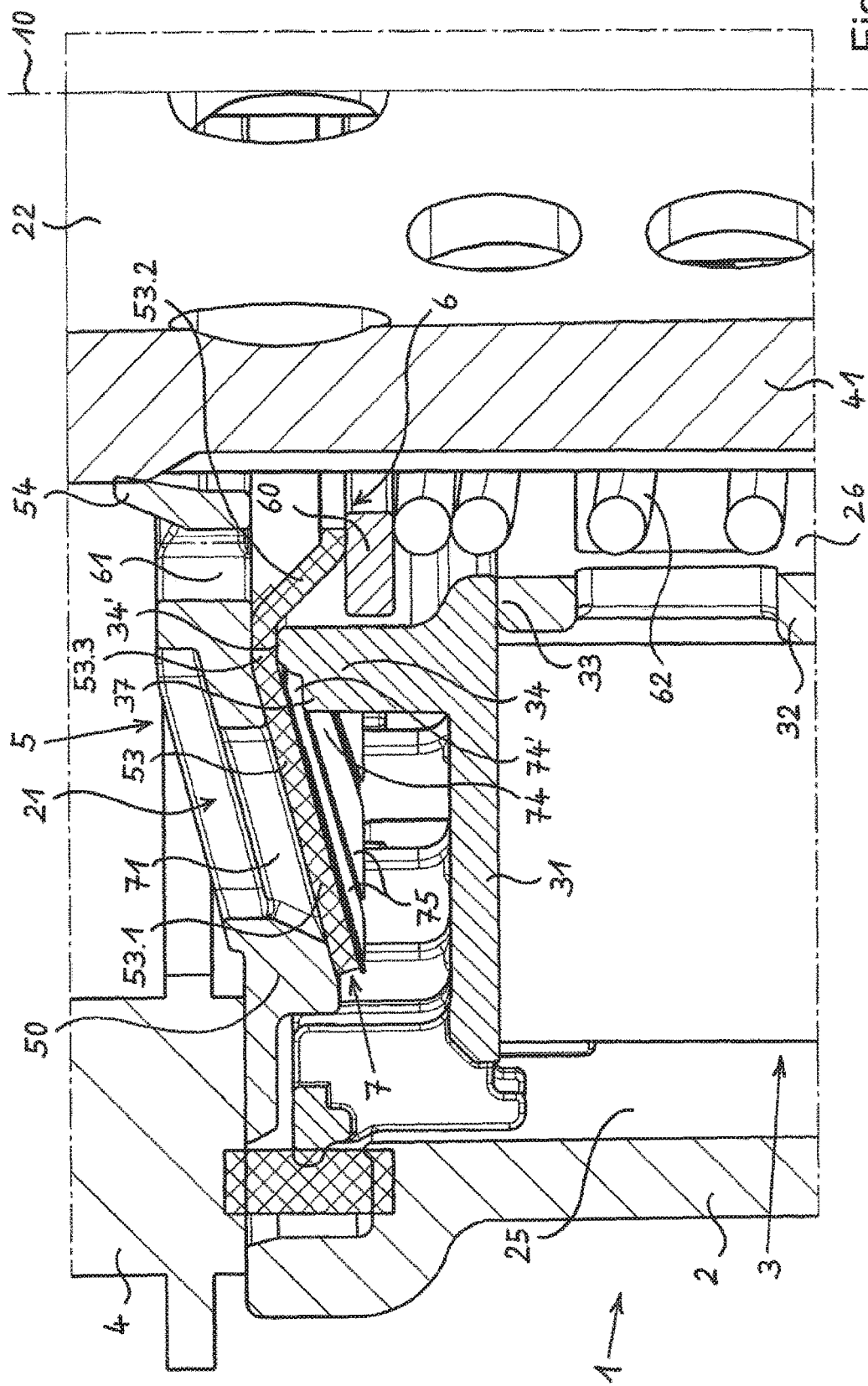
FIG. 14 shows the valve unit of FIG. 13 with the filter bypass valve in the open position and the non-return valve in the closed position, in an enlarged partial longitudinal section.

FIG. 14 shows valve unit 5 of FIG. 13 with filter bypass valve 6 in the open position and non-return valve 7 in the closed position, in an enlarged partial longitudinal section. Due to a pressure difference between raw side 25 and clean side 26, exceeding a specifiable boundary value, the fluid pressure prevailing in fluid inlet 21 and at raw side 25 is capable of moving valve body 60 away from valve plate 50, against the force of valve spring 62, together with radially inner region 53.2 of valve membrane 53, thus releasing valve openings 61. Via valve openings 61, an immediate flow connection is now released from fluid inlet 21 to clean side 26 and to fluid outlet 22. When it is displaced in the opening direction, i.e., downward according to FIG. 14, valve body 60 is axially guided with its outer periphery on the inner periphery of pressure-exerting ring 34 on end disc 31.

Figure 15:
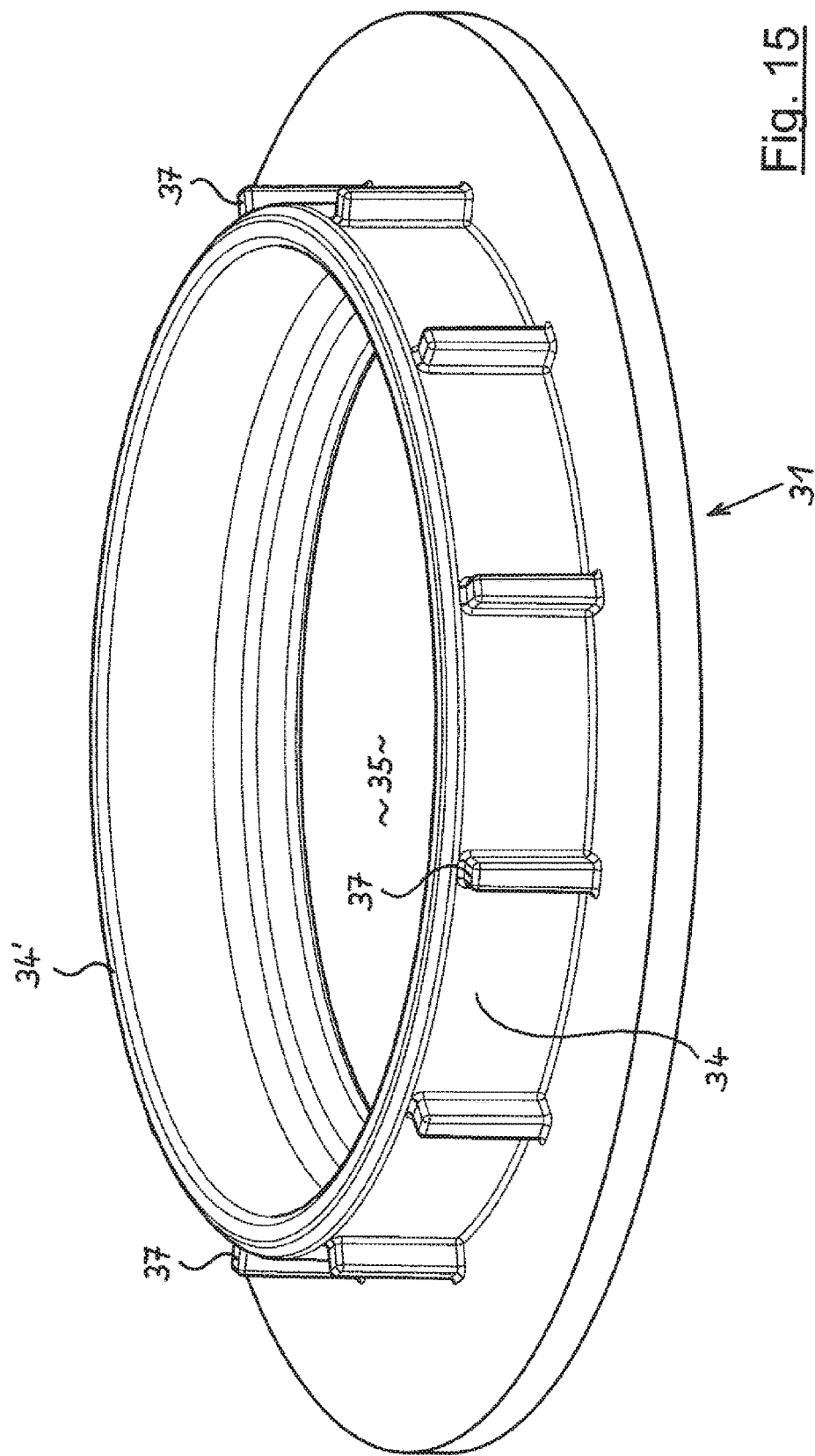
FIG. 15 shows a first valve-side end disc of the filter insert, having a pressure-exerting ring and having support elements, in a first embodiment, in an oblique view from above.

FIG. 15 shows, as an individual part of the filter insert of the fluid filter, a first valve-side end disc 31 of the filter insert, having a pressure-exerting ring 34 and having support elements 37, in a first embodiment, in an oblique view from above. The filter material body (not shown here) is capable of being connected to the downward-pointing (in FIG. 15) flat side of end disc 31, for example by welding or gluing. Central opening 35 of end disc 31 is situated in the center of the disc. Pressure-exerting ring 34 is integrally formed in one piece on the upward-pointing side of end disc 31. The free, upward-pointing end face 34' of pressure-exerting ring 34 is used to press the valve membrane onto the valve plate in the assembled state, as explained above.

A plurality of axially running ribs or webs are integrally formed on the outer periphery of pressure-exerting ring 34 at regularly spaced intervals, as support elements 37 for the pre-tensioning and/or pressing of the valve disc onto the valve membrane and onto the valve plate of the fluid filter. At bottom, support elements 37 go out from the upper side of the flat part of end disc 31. The upper end face of each of the support elements 37 is set back by a certain distance relative to end face 34' of pressure-exerting ring 34, in order to enable the spring disc, which has the shape of a circular annular disc, to be centered on pressure-exerting ring 34.

Figure 16:
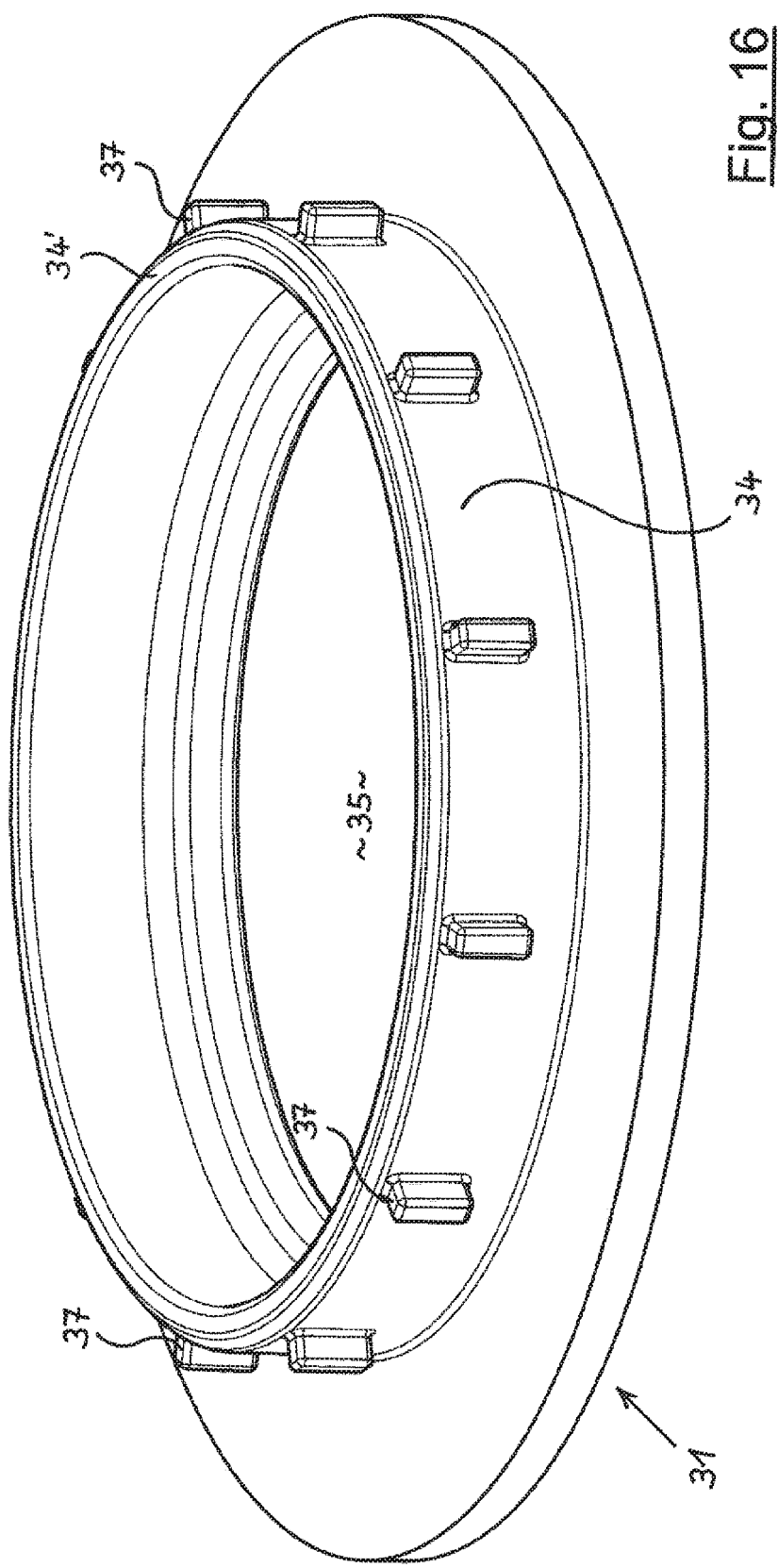
FIG. 16 shows a second valve-side end disc of the filter insert, having a pressure-exerting ring and having support elements, in a second embodiment in an oblique view from above.

FIG. 16 shows a second valve-side end disc 31 of the filter insert, having a pressure-exerting ring 34 and having support elements 37, in a second embodiment, in an oblique view from above. Differing from the example according to FIG. 15, in the example according to FIG. 16, support elements 37 are made shorter in their axial length, and at bottom have a distance from the upper side of the flat part of end disc 31. In other respects, end disc 31 according to FIG. 16 corresponds to the example according to FIG. 15.

Figure 17:
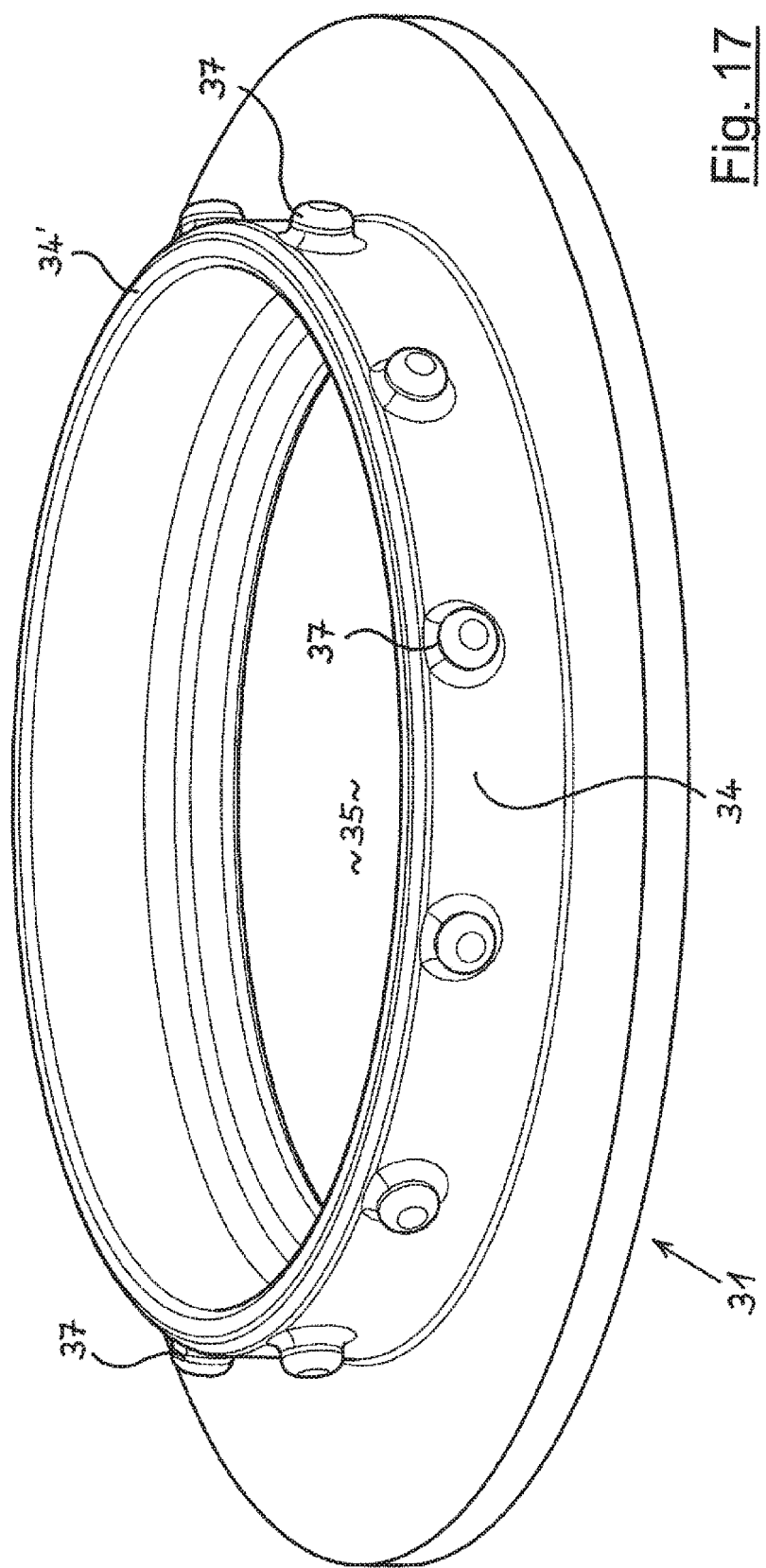
FIG. 17 shows a third valve-side end disc of the filter insert, having a pressure-exerting ring and having support elements, in a third embodiment, in an oblique view from above.

FIG. 17 shows a third valve-side end disc 31 of the filter insert, having a pressure-exerting ring 34 and having support elements 37, in a third embodiment, in an oblique view from above. Differing from the two examples described above according to FIGS. 15 and 16, in the example according to FIG. 17, support elements 37 are realized in the form of round knobs. With support elements 37 realized in this way as well, the spring disc of the valve unit can be pre-tensioned and/or pressed on, and simultaneously centered.

Figure 18:
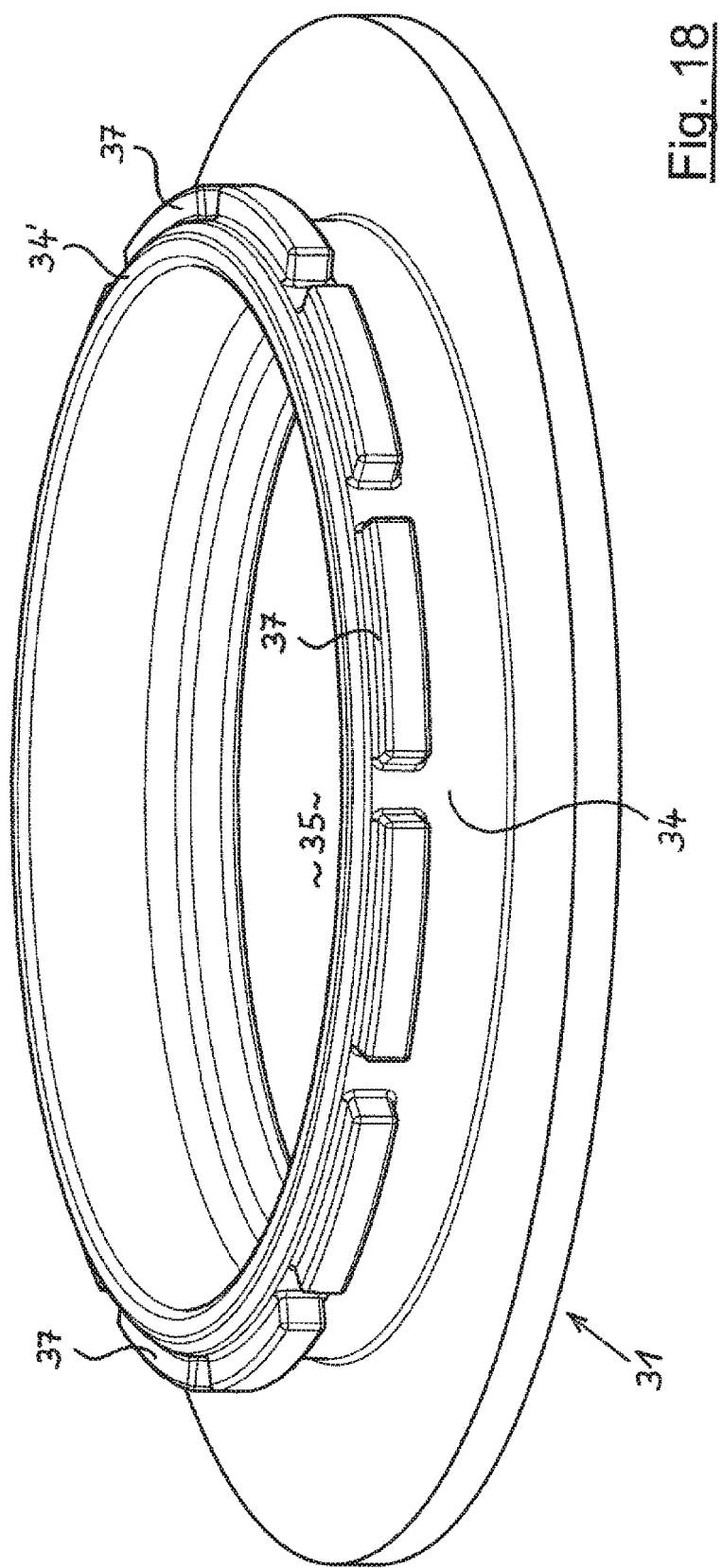
FIG. 18 shows a fourth valve-side end disc of the filter insert, having a pressure-exerting ring and having support elements, in a fourth embodiment in an oblique view from above.

FIG. 18 shows a fourth valve-side end disc 31 of the filter insert, having a pressure-exerting ring 34 and having support elements 37 in a fourth embodiment, again in an oblique view from above. Differing from the examples according to FIGS. 15 through 17, in the example according to FIG. 18, support elements 37 are realized as a ring of short ribs or webs situated at a distance from one another in the peripheral direction of pressure-exerting ring 34.

Figure 19:
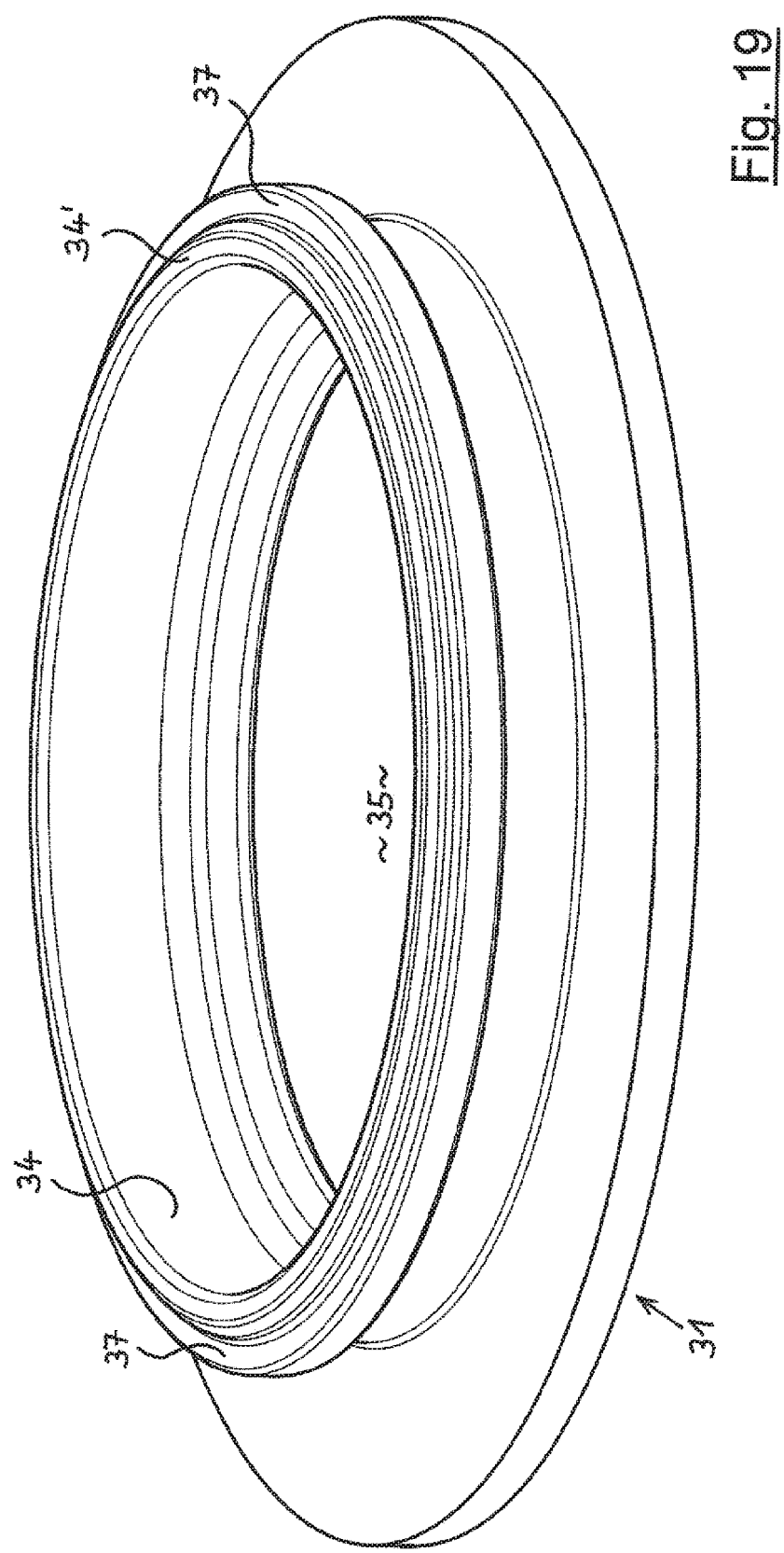
FIG. 19 shows a fifth valve-side end disc of the filter insert, having a pressure-exerting ring and having a support element, in a fifth embodiment in an oblique view from above.

FIG. 19 shows a fifth valve-side end disc 31 of the filter insert, having a pressure-exerting ring 34 and having a support element 37, in a fifth embodiment, in an oblique view from above. In this example of end disc 31, an individual support element 37, in the form of a continuous, peripheral rib, is integrally formed on the outer periphery of pressure-exerting ring 34, close to its free end face 34'.

With the exception of support elements 37, the exemplary embodiments of end disc 31 shown in FIGS. 15 through 19 agree with one another, so that in this regard the description of the example according to FIG. 15, to which reference is made, also holds for the examples according to FIGS. 16 through 19.

Figure 20:
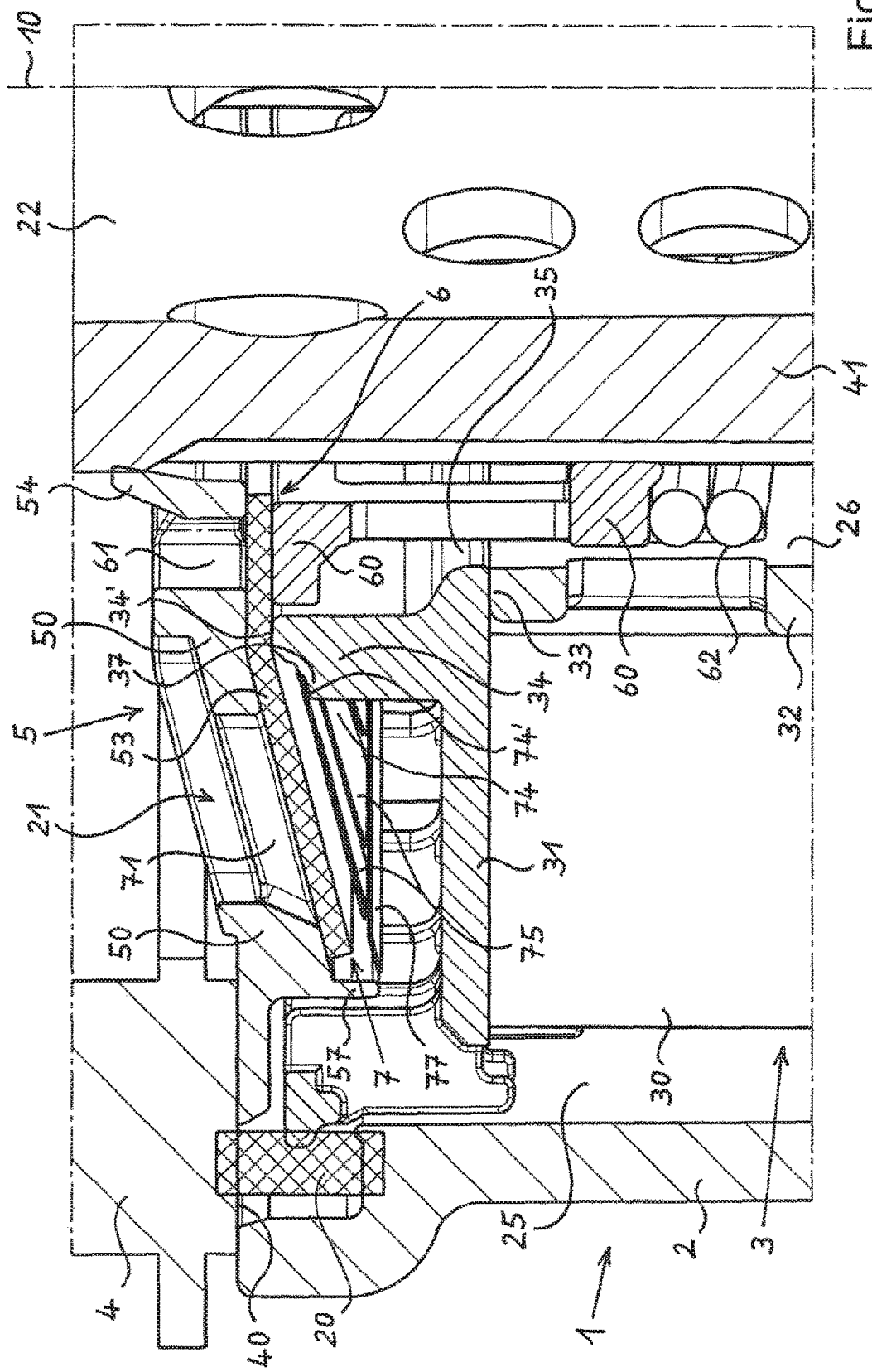
FIG. 20 shows a fifth valve unit in which, relative to FIG. 9, the valve plate and the spring disc of the valve unit are modified, having the filter bypass valve and the non-return valve in the closed position, in an enlarged partial longitudinal section.

FIG. 20 shows a fifth valve unit 5, in which, in comparison with FIG. 9, valve plate 50 and spring disc 74 of valve unit 5 have been modified, with filter bypass valve 6 and non-return valve 7 in the closed position, in an enlarged partial longitudinal section.

A first modification relative to the example of FIG. 9 is that in the example according to FIG. 20, valve plate 50 has a protective collar 57 on its edge region adjacent to the radially outer end of valve membrane 53 and spring disc 74, the collar protruding in the direction towards valve membrane 53 and towards spring disc 74, the height of the collar in the axial direction being at least as large as, and preferably larger than, the summed heights of valve membrane 53 and spring disc 74 in the axial direction. This protective collar 57 protects valve membrane 53 and spring disc 74, which are sensitive to mechanical influences, thus contributing to a high degree of operational reliability and long working life of valve unit 5.

A second modification in comparison to the example of FIG. 9 is that in the example of FIG. 20, spring disc 74 has, radially external to its spring tongues 75, a protective ring 77 that is made in one piece with or connected to the rest of spring disc 74. This protective ring 77 protects the sensitive spring tongues 75 of spring disc 74 against damaging mechanical effects from the outside.

In its other parts and functions, the example of fluid filter 1 according to FIG. 20 matches the example according to FIG. 9, to whose description reference is made.

Figure 21:
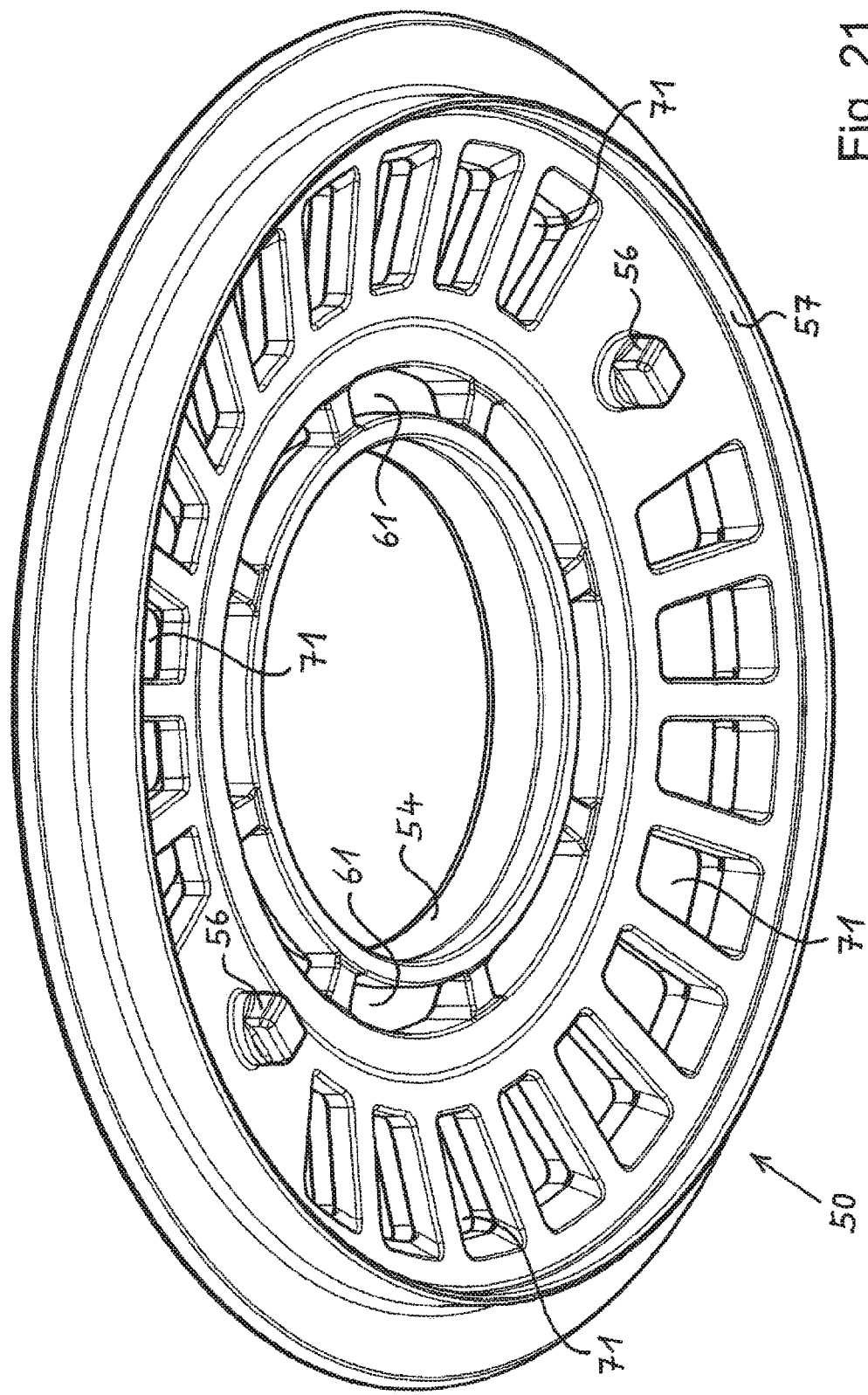
FIG. 21 shows a valve plate of the valve unit in an oblique view from below.

FIG. 21 shows a valve plate 50 of valve unit 5 as an individual part, in an oblique view from below. Here, the basic shape of the valve plate 50, that of a circular annular disc, can be seen. Radially inwardly, valve plate 50 has peripheral sealing lip 54, surrounding the central opening. Radially external thereto, valve openings 61 of the filter bypass valve are distributed in the peripheral direction. Radially further externally, there follows a region of valve plate 50 that is free of perforations, in which, in the assembled state, the valve membrane is pressed onto valve plate 50 by means of the pressure-exerting ring of the filter insert.

Still further radially outward there then follow valve openings 71 of the non-return valve, distributed in the peripheral direction. Each two adjacent valve openings 71 have an increased spacing in two regions situated diametrically opposite one another. In each of these regions, a retaining pin 56 protruding from the surface of valve plate 50 is integrally formed, which is used to retain a spring disc of the valve unit.

Peripheral protective collar 57 is situated radially external to valve openings 71. Radially furthest out, valve plate 50 has a flat edge with which valve plate 50 can be placed onto the connecting flange, as explained above.

Figure 22:
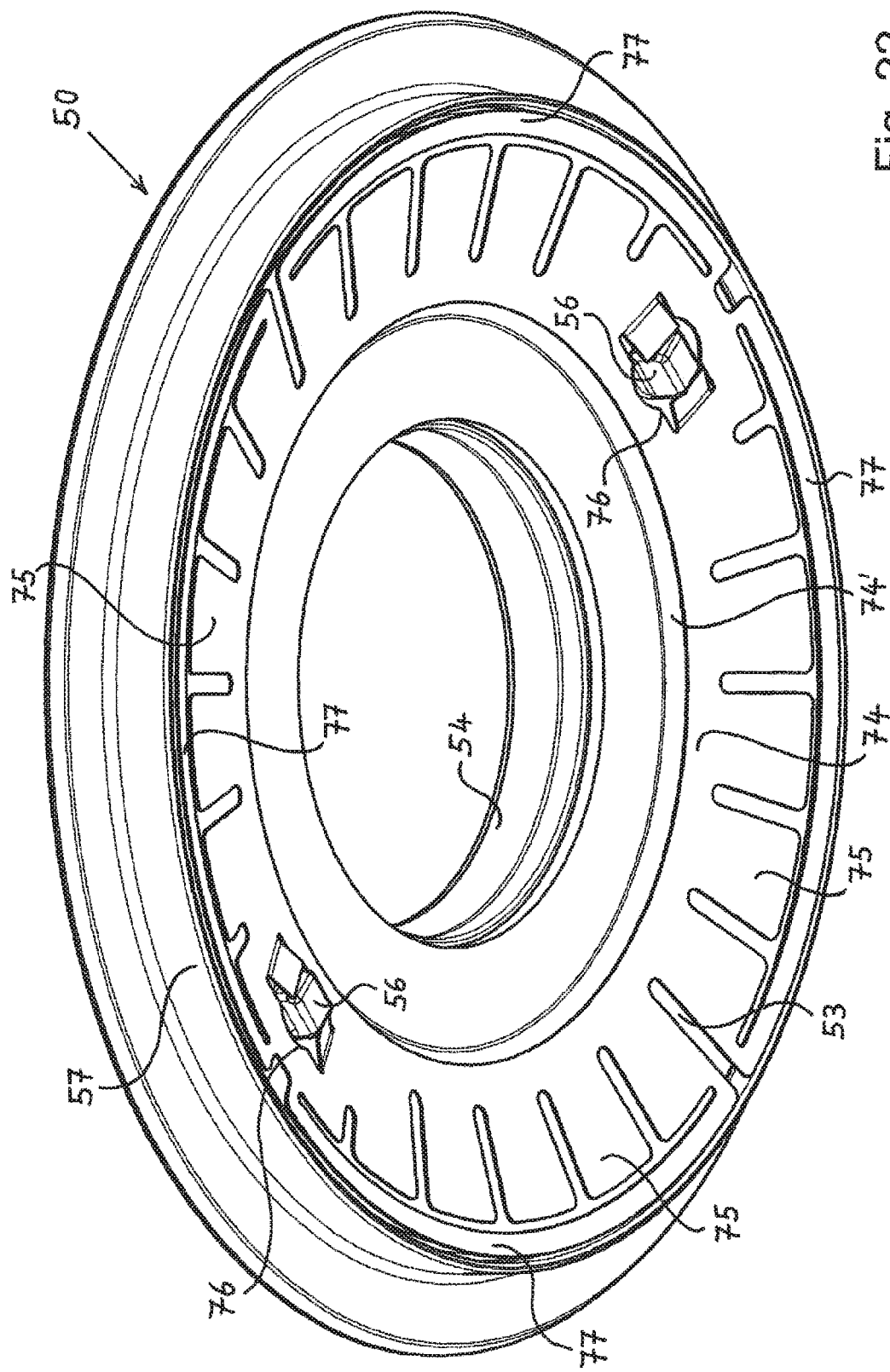
FIG. 22 shows the valve plate of FIG. 21 with spring disc attached thereto, in an oblique view from below.

FIG. 22 shows valve plate 50 of FIG. 21 having spring disc 74 attached thereon, in an oblique view from below. Spring disc 74 has retaining holes 76 situated in positional alignment with retaining pins 56, with which holes spring disc 74 is pressed onto retaining pins 56. In this way, spring disc 74 is already held captive on valve plate 50. Radially inwardly, spring disc 74 has an edge region 74' that is used for interaction with the support elements on the pressure-exerting ring of the filter insert. The radially outward-pointing spring tongues 75 are configured so as to be distributed around the peripheral direction of spring disc 74. Radially external to the free end of spring tongues 75 there runs protective ring 77, which is made in one piece with the rest of spring disc 74. In the example according to FIG. 22, protective ring 77 is divided in the peripheral direction into a plurality of segments, here four segments, each connected in one piece to the rest of spring disc 74 at their ends via material webs or bridges.

Figure 23:
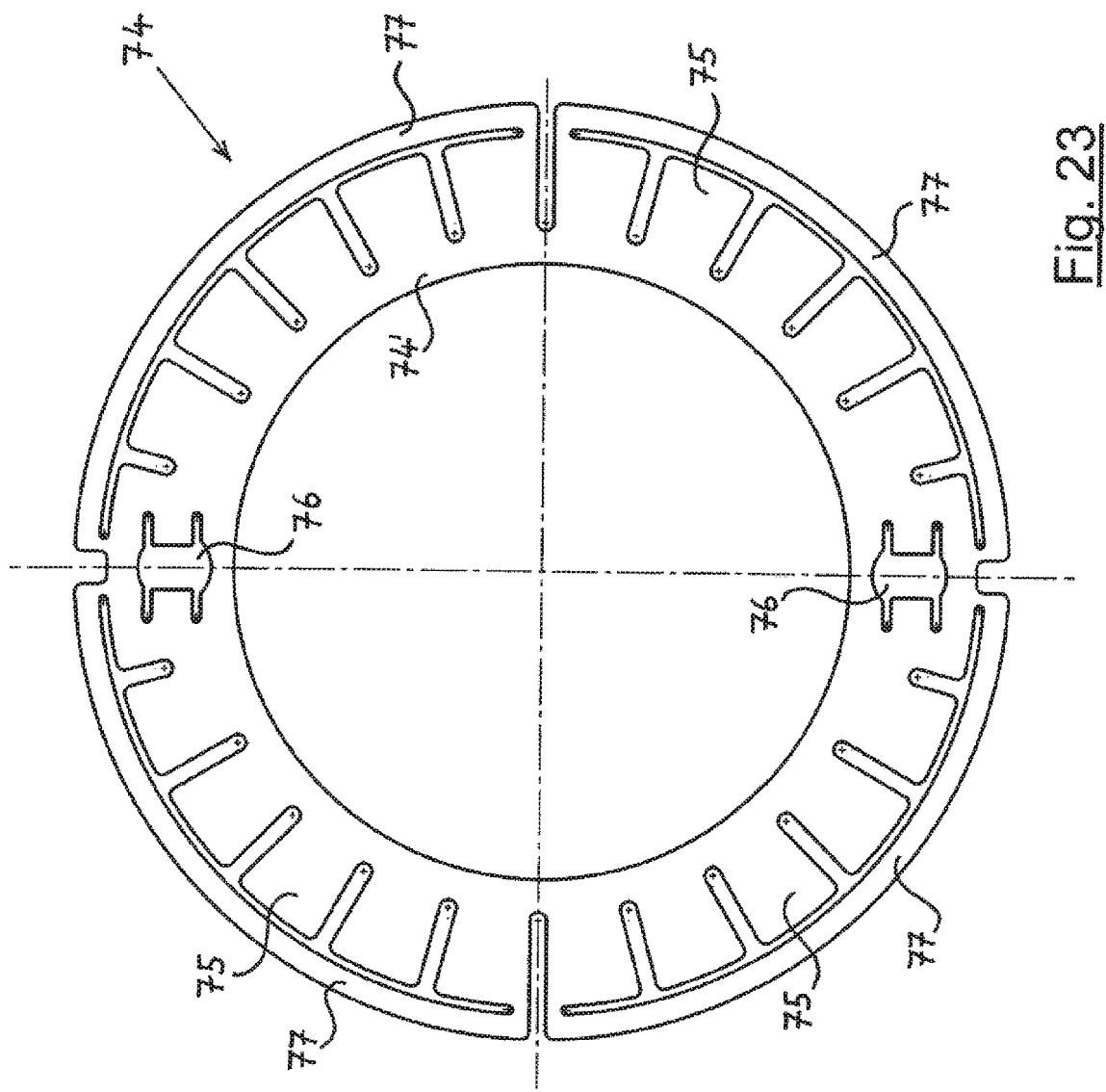
FIG. 23 shows the spring disc of FIG. 22 in a top view.

FIG. 23 shows a spring plate 74 of FIG. 22 in a top view. Radially inwardly there is situated region 74', for pre-tensioning and/or exerting pressure on spring disc 74. Pointing radially outward, and distributed in the peripheral direction, are spring tongues 75. At top and bottom in FIG. 23, one of the retaining holes 76 is respectively visible, for connecting spring disc 74 to the retaining pins of the valve plate. Furthest out radially, there runs protective ring 77, with its four segments, each connected in one piece to the rest of spring disc 74. This embodiment of spring disc 74 has the specific advantage that protective ring 77 is particularly flexible, because it has slots, and during operation can lift off together with spring tongues 75.

Figure 24:
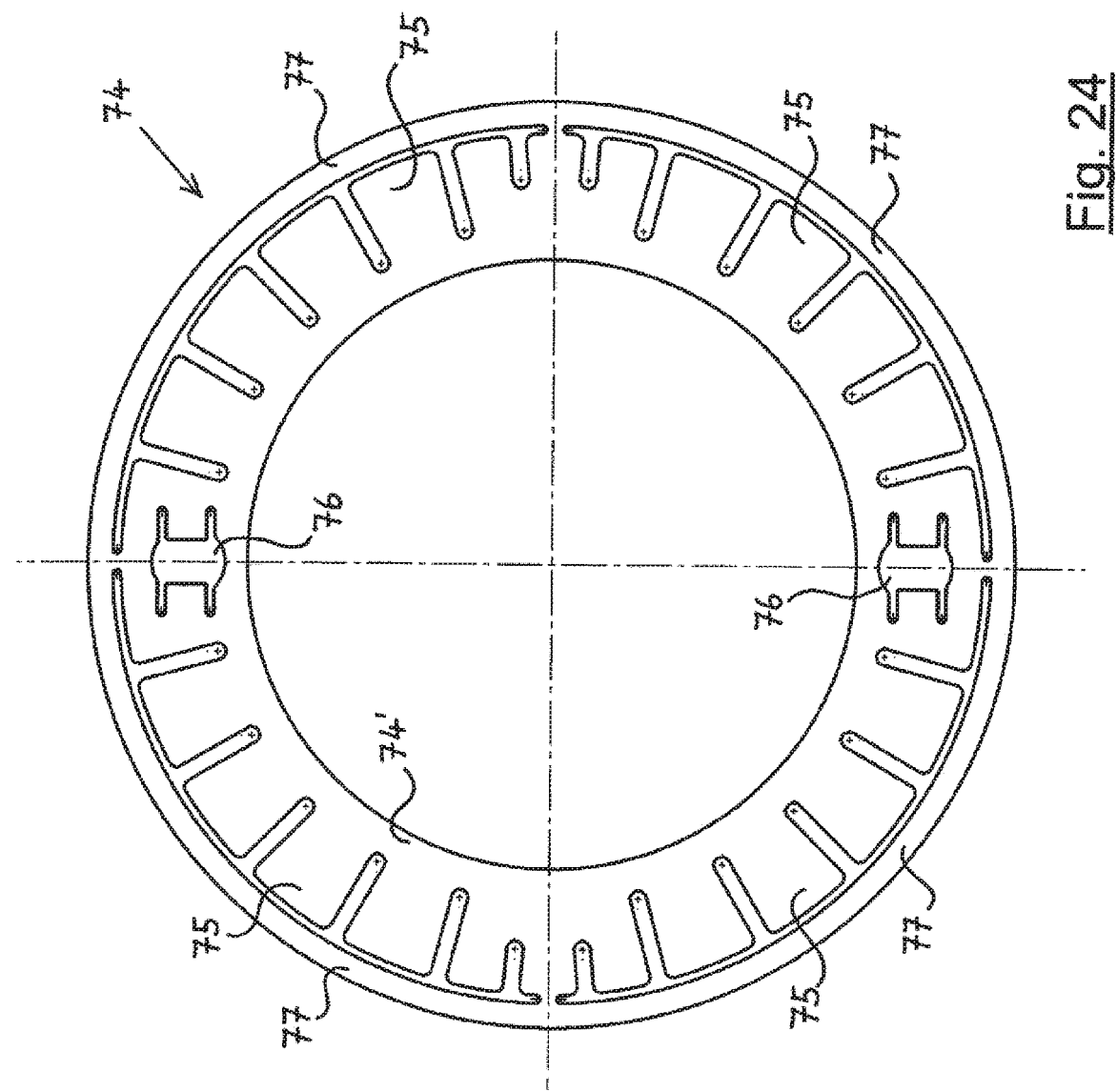
FIG. 24 shows the spring disc of FIG. 23 in a modified embodiment, also in a top view.

Finally, FIG. 24 shows a spring disc 74 in an embodiment modified relative to FIG. 23, also in a top view. Differing from the example of FIG. 23, here protective ring 77 is realized as a continuous peripheral one-part ring connected in one piece to the rest of spring disc 74 at four points distributed uniformly in the peripheral direction, in each case via a material bridge. This embodiment of spring disc 74 has the advantage that it is radially outwardly protected particularly well against damage, because protective ring 77 is closed around its periphery.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 fluid filter
10 longitudinal mid-axis of 1
2 housing
20 seal
21 fluid inlet
22 fluid outlet
24 screw connection of 2 with 41
25 raw side
26 clean side
3 filter insert
30 filter material body
31, 31' end discs (top, bottom)
32 support body in 30
32' support lugs on 32
33, 33' ends of 32 (top, bottom)
34 pressure-exerting ring on 3 for 53
34' end face of 34
35 central opening in 31
37 support element(s) for 74 on 34
4 connecting flange
40 sealing surface
41 central pipe socket
42 screw connection of 41 in 43
43 central threaded socket in 4
46 spring support for 62 on 41
5 valve unit
50 valve plate
53 valve membrane
53.1 radially outer region of 53
53.2 radially inner region of 53
53.3 radial intermediate region of 53
54 sealing lip on 50
56 retaining pins on 50
57 protective collar on 50
6 filter bypass valve
60 valve body of 6
61 valve openings for 6 in 50
62 valve spring of 6
7 non-return valve
71 valve openings for 7 in 50
74 spring disc
74' radially inner region of 74
75 spring tongues on 74
76 retaining holes in 74
77 protective ring on 74

The invention claimed is:

1. A fluid filter comprising:
a housing, having a fluid inlet that opens into a raw side of the fluid filter, and having a fluid outlet that goes out from a clean side of the fluid filter,
an exchangeable hollow cylindrical filter insert, with a filter material body configured to filter a fluid, that separates the raw side and clean side from each other, and
a valve unit, the valve unit comprising:
a valve plate situated concentrically in the housing and having a basic shape of a circular annular disc,
valve openings in the valve plate, and
a flexible valve membrane in a shape of a circular annular disc situated on the valve plate and configured to cover the valve openings,
wherein the filter insert has, on an end face facing the valve unit in an installed state, an axially protruding pressure-exerting ring in a form of a peripheral annular collar;
wherein when the filter insert is installed in the housing, the filter insert presses the valve membrane axially onto the valve plate with an end face of the pressure-exerting ring;

wherein the valve membrane is pressed onto the valve plate by the pressure-exerting ring and forms a seal that separates the raw side and the clean side of the fluid filter from one another;

wherein the pressure-exerting ring is one of connected to or made in one piece with an end disc of the filter insert that faces the valve unit in the installed state of the filter insert;

wherein the fluid filter has a central pipe socket having a first end that is threaded and a second end, opposite the first end, that is threaded, and wherein the filter insert surrounds the central pipe socket, the first end of the central pipe socket removably screwed into the valve unit and the second end of the central pipe socket removably screwed into a first end of the housing, the first end of the housing opposite a second end of the housing, and the second end of the housing configured to receive the filter insert;

wherein the valve plate sits in sealing fashion on an outer periphery of the central pipe socket;

wherein the valve unit has a filter bypass valve and has a non-return valve;

wherein the valve plate and the valve membrane are each both a part of the filter bypass valve and also a part of the non-return valve;

wherein when the filter insert is installed in the housing, the filter insert presses the valve membrane onto the valve plate with the pressure-exerting ring situated on the filter insert;

wherein, seen in a radial direction, the valve membrane has two membrane regions adjacent in the radial direction, a first membrane region being assigned to the non-return valve and a second membrane region being assigned to the filter bypass valve;

wherein at opening the non-return valve the first membrane region is deflected around the pressure-exerting ring in a direction away from the valve plate; and wherein at opening the filter bypass valve the second membrane region is deflected around the pressure-exerting ring in a direction away from the valve plate.

2. The fluid filter as recited in claim 1, and wherein when the filter insert is installed in the housing, the filter insert further presses the valve membrane onto the valve plate with the pressure-exerting ring, and wherein the pressure-exerting ring forms, with an inner periphery, a radial centering and guide unit for a valve body of the filter bypass valve that is axially displaceable on the central pipe socket and is pre-loaded with a force in a valve closing direction.

3. The fluid filter as recited in claim 2, wherein the valve body is formed by a sleeve body having a hollow cylindrical basic shape or by a ring body having a rectangular cross-section.

4. The fluid filter as recited in claim 1, wherein on a side of the first membrane region, assigned to the non-return valve, facing away from the valve plate there is situated a spring disc having spring tongues pointing outward in the radial direction, and wherein, when the filter insert is installed in the housing, the filter insert engages the spring disc to either pre-tension or exert pressure on the spring disc in the direction toward the valve membrane, with the pressure-exerting ring.

5. The fluid filter as recited in claim 4, wherein the pressure-exerting ring has on an outer peripheral surface at least one support element that protrudes radially and is axially set back relative to the end face of the pressure-exerting ring, and that at least one of pre-tensions or exerts pressure on the spring disc in a direction towards the valve membrane, said at least one support element comprising a single support element being provided in a form of a web that runs around in a peripheral direction, or a plurality of support elements, situated at a distance from one another in the peripheral direction, being provided in a form of one of cams or of ribs or webs that run in an axial direction or the peripheral direction.

6. The fluid filter as recited in claim 4, wherein the spring disc is connected at points to the valve plate with interposition of the valve membrane.

7. The fluid filter as recited in claim 6, wherein two or more retaining pins extend from the valve plate in a direction toward the spring disc, and wherein the spring disc has two or more retaining holes situated in positional agreement with the retaining pins, wherein the retaining pins engage with the retaining holes.

8. The fluid filter as recited in claim 7, wherein the spring disc is one of pressed or clamped onto the retaining pins with the retaining holes.

9. The fluid filter as recited in claim 4, wherein at least one of
the spring disc has a protective ring made in one piece with said spring disc and surrounding the spring tongues radially externally, and
on the valve plate there is situated a protective collar that surrounds the spring tongues of the spring disc radially externally.

10. The fluid filter as recited in claim 1, wherein between the housing and the filter insert there is situated an axially springy component that exerts a force on the filter insert, in the installed state thereof, acting in a direction toward the valve plate.

11. The fluid filter as recited in claim 10, wherein the axially springy component is a mesh-shaped support body situated in the interior of the filter insert that, in the installed state of the filter insert, is supported at a first end on the housing and at a second end on the filter insert.

12. A filter insert for use in a fluid filter having a housing, having a fluid inlet that opens into a raw side of the fluid filter, a fluid outlet that goes out from a clean side of the fluid filter, and a valve unit with a valve plate situated concentrically in the housing and having a basic shape of a circular annular disc, valve openings in the valve plate, and a flexible valve membrane in a shape of a circular annular disc situated on the valve plate and configured to cover the valve openings, wherein the valve unit has a filter bypass valve and has a non-return valve; wherein the valve plate and the valve membrane are each both a part of the filter bypass valve and also a part of the non-return valve, wherein, seen in a radial direction, the valve membrane has two membrane regions adjacent in the radial direction, a first membrane region being assigned to the non-return valve and a second membrane region being assigned to the filter bypass valve, wherein the fluid filter has a central pipe socket having a first end that is threaded and a second end, opposite the first end, that is threaded, the first end of the central pipe socket removably screwed into the valve unit and the second end of the central pipe socket removably screwed into a first end of the housing, the first end of the housing opposite a second end of the housing, and the second end of the housing configured to receive the filter insert, wherein the filter insert comprises
on an end face facing the valve unit in an installed state, an axially protruding pressure-exerting ring in a form of a peripheral annular collar;
wherein when the filter insert is installed in the housing the valve membrane is configured to be pressed onto the valve plate with the pressure-exerting ring so as to separate the raw side and clean side of the fluid filter from one another, the filter insert presses the valve membrane axially onto the valve plate with an end face of the pressure-exerting ring, the filter insert surrounds the central pipe socket, the valve plate sits in sealing fashion on an outer periphery of the central pipe socket, and, the filter insert presses the valve membrane onto the valve plate with the pressure-exerting rind, situated on the filter insert;

wherein at opening the non-return valve the first membrane region is deflected around the pressure-exerting ring in a direction away from the valve plate; and wherein at opening the filter bypass valve the second membrane region is deflected around the pressure-exerting ring in a direction away from the valve plate wherein the pressure-exerting ring is one of connected to or made in one piece with an end disc of the filter insert that faces the valve unit in the installed state of the filter insert; and wherein the pressure-exerting ring has on an outer peripheral surface at least one radially protruding support element that is axially set back relative to the end face of the pressure-exerting ring, in which the at least one radially protruding support element is configured to engage a spring disc to pre-tension or exert pressure on the spring disc in a direction toward the valve membrane in the installed state of the filter insert.

13. The filter insert as recited in claim 12, wherein the at least one radially protruding support element is provided in a form of a web running around in a peripheral direction, or a plurality of radially protruding support elements, situated at a distance from one another in the peripheral direction, are provided in the form of one of cams or ribs or webs running in an axial direction or the peripheral direction.

14. The filter insert as recited in claim 12, wherein in the interior of the filter insert there is situated a mesh-shaped support body that forms an axially springy component, which, in the installed state of the filter insert, is configured to be supported with a first end on the housing and with a second end on the filter insert.

15. The fluid filter as recited in claim 1, wherein a contact area between the pressure exerting ring and the valve membrane is positioned in a radial membrane intermediate region of the valve membrane, the radial membrane intermediated region between the first and second membrane regions.

* * * * *